(12) United States Patent
Kunii et al.

(10) Patent No.: US 11,701,994 B2
(45) Date of Patent: *Jul. 18, 2023

(54) VEHICLE

(71) Applicant: MAXELL, LTD., Kyoto (JP)

(72) Inventors: Yasuhiko Kunii, Kyoto (JP); Nobuyuki Kaku, Kyoto (JP); Masahiro Kishigami, Kyoto (JP); Hiroyuki Nakamura, Kyoto (JP); Megumi Kurachi, Kyoto (JP); Takuya Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,464

(22) Filed: Jan. 3, 2022

(65) Prior Publication Data

US 2022/0121048 A1 Apr. 21, 2022

Related U.S. Application Data

(63) Continuation of application No. 15/543,219, filed as application No. PCT/JP2015/084820 on Dec. 11, 2015.

(30) Foreign Application Priority Data

Jan. 13, 2015 (JP) .................................. 2015-003961
Aug. 5, 2015 (JP) .................................. 2015-155164

(51) Int. Cl.
*G02F 1/13357* (2006.01)
*G03B 17/54* (2021.01)
(Continued)

(52) U.S. Cl.
CPC ......... *G02F 1/1336* (2013.01); *B60Q 1/0017* (2013.01); *B60Q 1/04* (2013.01);
(Continued)

(58) Field of Classification Search
CPC ...... G01C 21/365; B60Q 1/0017; B60Q 1/04; B60Q 1/24; B60Q 1/34; B60Q 1/38;
(Continued)

(56) References Cited

U.S. PATENT DOCUMENTS 6,733,134 B2   5/2004   Bleiner
7,561,180 B2   7/2009   Koike
(Continued)

FOREIGN PATENT DOCUMENTS

JP   H08-043781 A   2/1996
JP   2003-231450 A   8/2003
(Continued)

OTHER PUBLICATIONS

Non-Final Rejection issued in corresponding U.S. Appl. No. 15/543,219, dated May 10, 2019.
(Continued)

*Primary Examiner* — Katrina R Fujita
(74) *Attorney, Agent, or Firm* — McDermott Will & Emery LLP

(57) ABSTRACT

Based on information about a vehicle, the information can be projected and displayed onto a road surface or the like. An image projection apparatus, which projects an image, includes an acquisition unit that acquires the information about the vehicle, and an image projection unit that projects the image based on the information acquired by the acquisition unit.

8 Claims, 20 Drawing Sheets

(51) Int. Cl.

| | |
|---|---|
| *G03B 21/12* | (2006.01) |
| *B60Q 1/38* | (2006.01) |
| *B60Q 1/50* | (2006.01) |
| *B60Q 1/00* | (2006.01) |
| *H04N 9/31* | (2006.01) |
| *G08G 1/16* | (2006.01) |
| *G01C 21/36* | (2006.01) |
| *G03B 21/56* | (2006.01) |
| *B60Q 1/04* | (2006.01) |
| *B60Q 1/34* | (2006.01) |
| *G03B 21/14* | (2006.01) |
| *B60Q 9/00* | (2006.01) |
| *G02F 1/1335* | (2006.01) |
| *B60Q 1/24* | (2006.01) |

(52) U.S. Cl.
CPC ............... *B60Q 1/34* (2013.01); *B60Q 1/38* (2013.01); *B60Q 1/50* (2013.01); *G01C 21/365* (2013.01); *G03B 17/54* (2013.01); *G03B 21/12* (2013.01); *G03B 21/14* (2013.01); *G03B 21/562* (2013.01); *G08G 1/166* (2013.01); *G08G 1/167* (2013.01); *H04N 9/3179* (2013.01); *H04N 9/3194* (2013.01); *B60Q 1/24* (2013.01); *B60Q 9/00* (2013.01); *B60Q 2400/50* (2013.01); *G02F 1/133627* (2021.01)

(58) Field of Classification Search
CPC ........ B60Q 1/50; B60Q 9/00; B60Q 2400/50; G02F 1/1336; G02F 1/133627; G03B 17/54; G03B 21/12; G03B 21/14; G03B 21/562; G08G 1/166; G08G 1/167; H04N 9/3179; H04N 9/3194
See application file for complete search history.

(56) References Cited

U.S. PATENT DOCUMENTS

| | | | |
|---|---|---|---|
| 9,168,869 | B1 | 10/2015 | Kamal |
| 10,195,980 | B2 | 2/2019 | Widdowson et al. |
| 2003/0147247 | A1 | 8/2003 | Koike |
| 2003/0197606 | A1 | 10/2003 | Epstein |
| 2007/0280503 | A1 | 12/2007 | Kubota et al. |
| 2010/0198506 | A1 | 8/2010 | Neilhouse |
| 2012/0306368 | A1 | 12/2012 | Tatara |
| 2013/0120572 | A1 | 5/2013 | Kwon |
| 2013/0335212 | A1 | 12/2013 | Purks et al. |
| 2015/0203023 | A1 | 7/2015 | Marti et al. |

FOREIGN PATENT DOCUMENTS

| | | |
|---|---|---|
| JP | 2004-136838 | 5/2004 |
| JP | 2004-306894 A | 11/2004 |
| JP | 2005-161977 A | 6/2005 |
| JP | 2007-283933 A | 11/2007 |
| JP | 2007-323342 A | 12/2007 |
| JP | 2008-129764 A | 6/2008 |
| JP | 2008-143505 A | 6/2008 |
| JP | 2008-260336 A | 10/2008 |
| JP | 2009-184428 A | 8/2009 |
| JP | 2010-026759 A | 2/2010 |
| JP | 2012-247369 A | 12/2012 |
| JP | 2013-010491 A | 1/2013 |
| JP | 2014-013524 A | 1/2014 |
| JP | 2014-153868 A | 8/2014 |
| WO | 2013/121570 A1 | 8/2013 |
| WO | 2014/122750 A1 | 8/2014 |

OTHER PUBLICATIONS

Final Rejection issued in corresponding U.S. Appl. No. 15/543,219, dated Nov. 20, 2019.
Non-Final Rejection issued in corresponding U.S. Appl. No. 15/543,219, dated Jun. 12, 2020.
Final Rejection issued in corresponding U.S. Appl. No. 15/543,219, dated Nov. 2, 2020.
Non-Final Rejection issued in corresponding U.S. Appl. No. 15/543,219, dated Mar. 24, 2021.
Final Rejection issued in corresponding U.S. Appl. No. 15/543,219, dated Jul. 12, 2021.
Japanese Office Action issued in corresponding Japanese Patent Application No. 2016-569264, dated Oct. 23, 2018, with English Translation.
Office Action issued in corresponding Japanese Patent Application No. 2016-569264, dated Feb. 27, 2018.
Search Report issued in corresponding International Patent Application No. PCT/JP2015/084820, dated Mar. 15, 2016.
Japanese Notice of Reasons for Refusal issued in corresponding Japanese Patent Application No. 2019-154419, dated Sep. 15, 2020, with English translation.
Office Action issued in corresponding Chinese Patent Application No. 201910752075.8, dated Jul. 12, 2022, with English translation.

FIG. 1
(A)
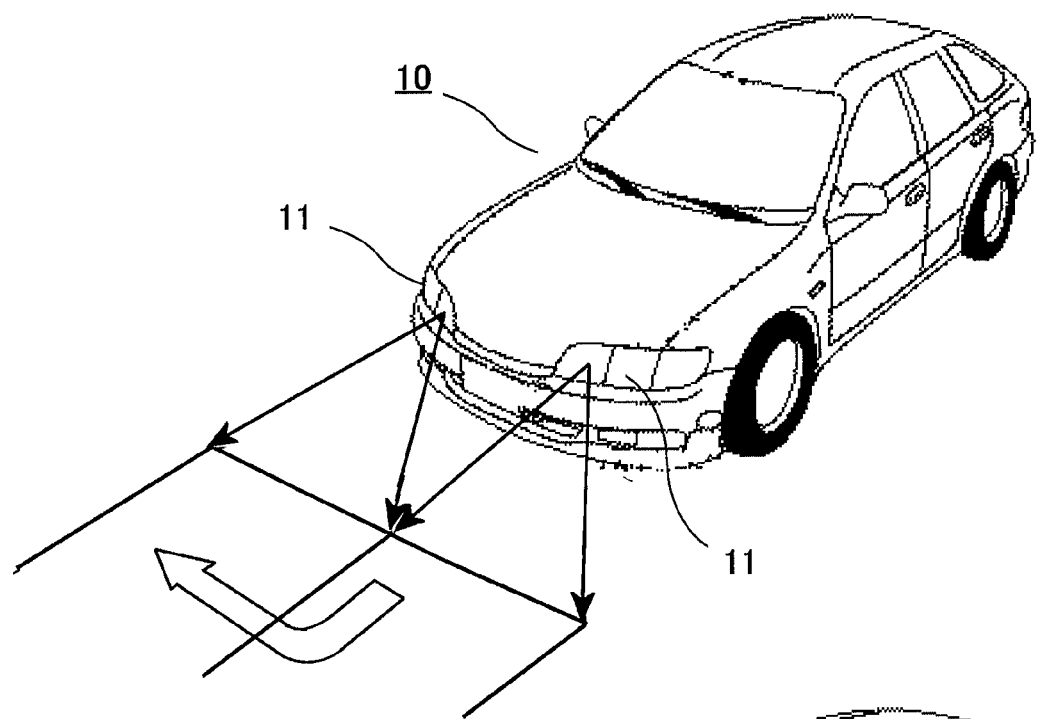
(B)
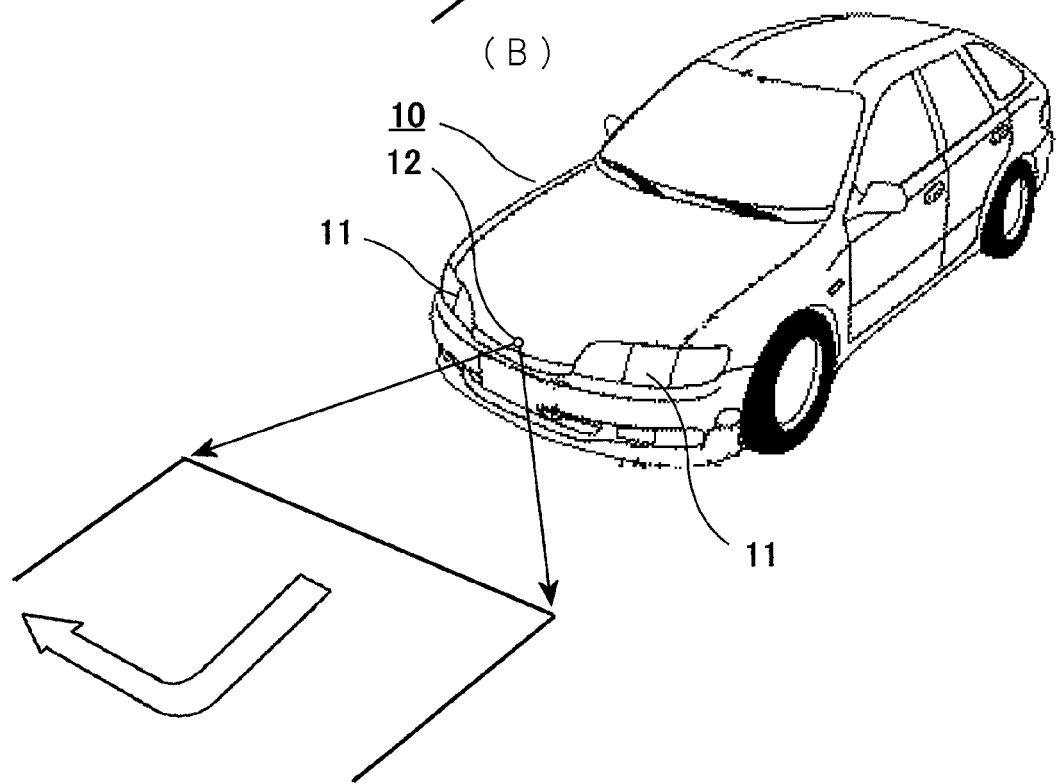

FIG. 2
(A)
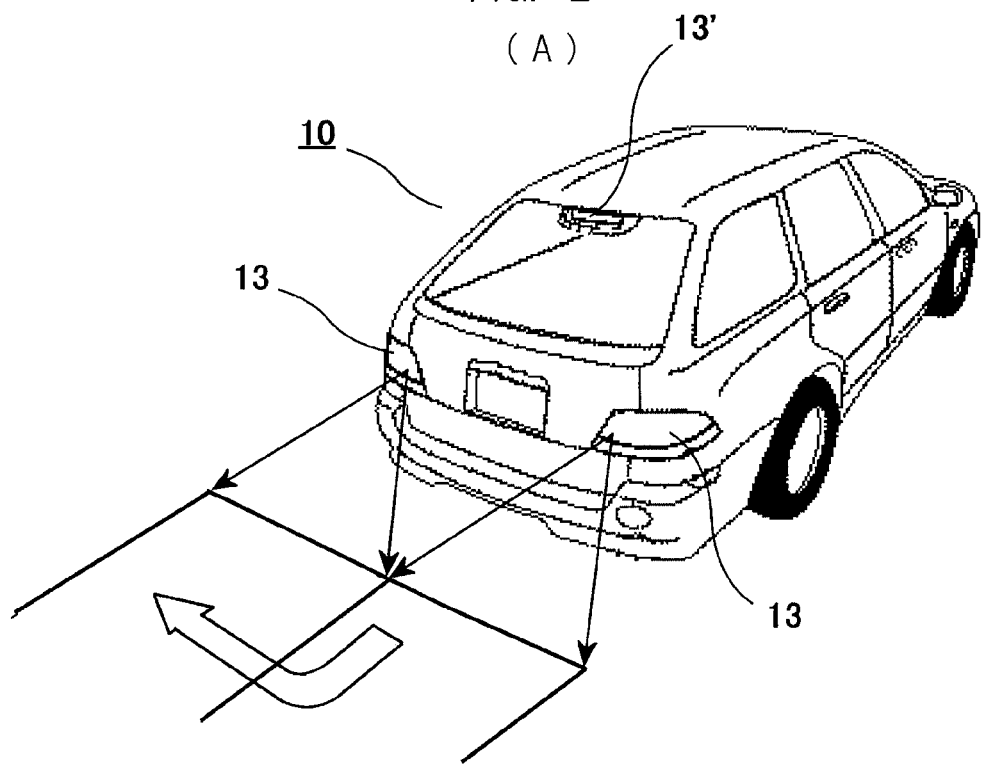
(B)
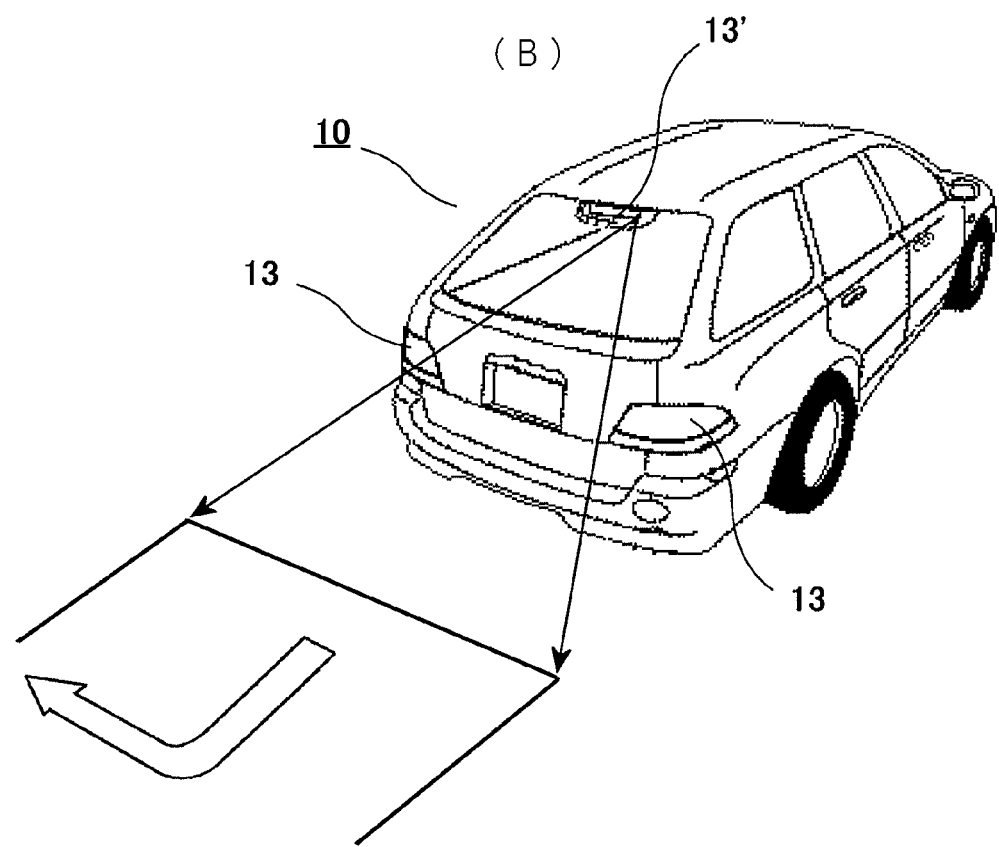

FIG. 7
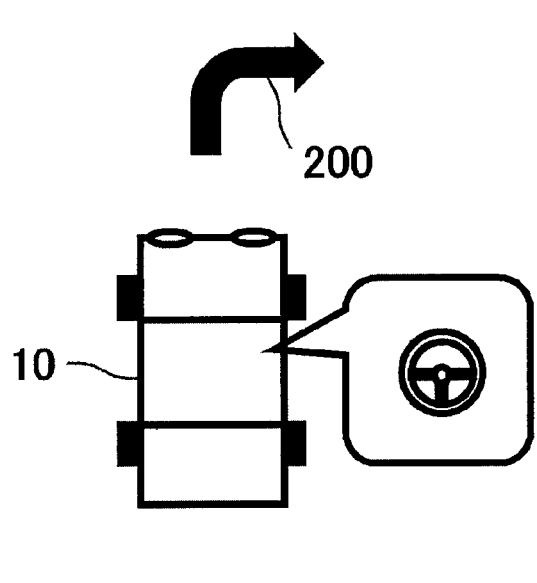
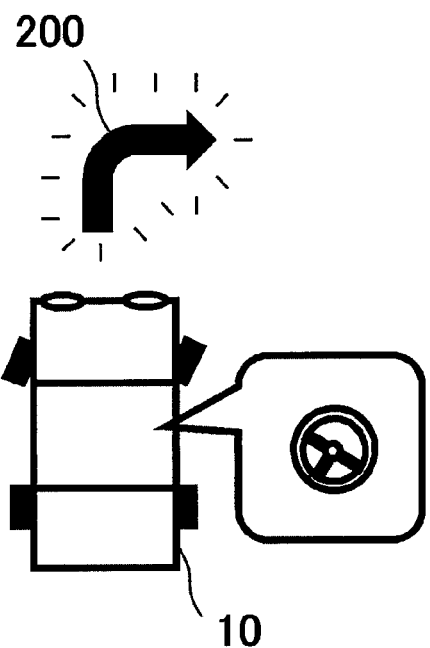

FIG. 12
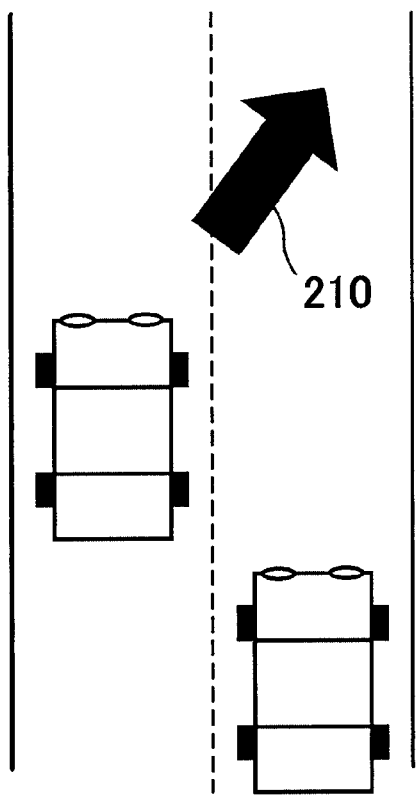
(A)
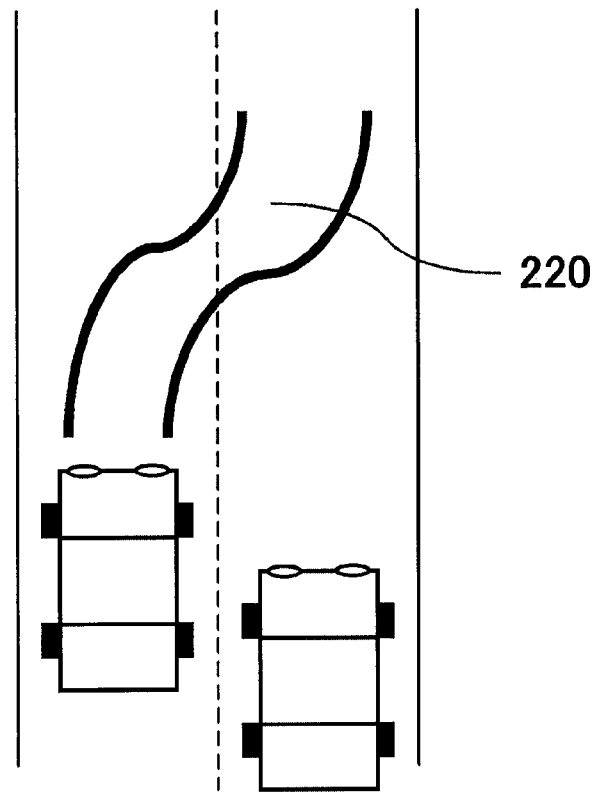
(B)

FIG. 15
(A)
(B)
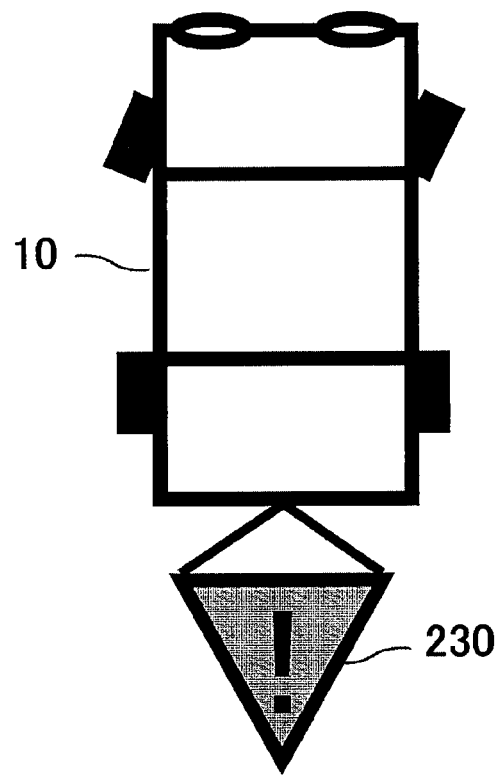
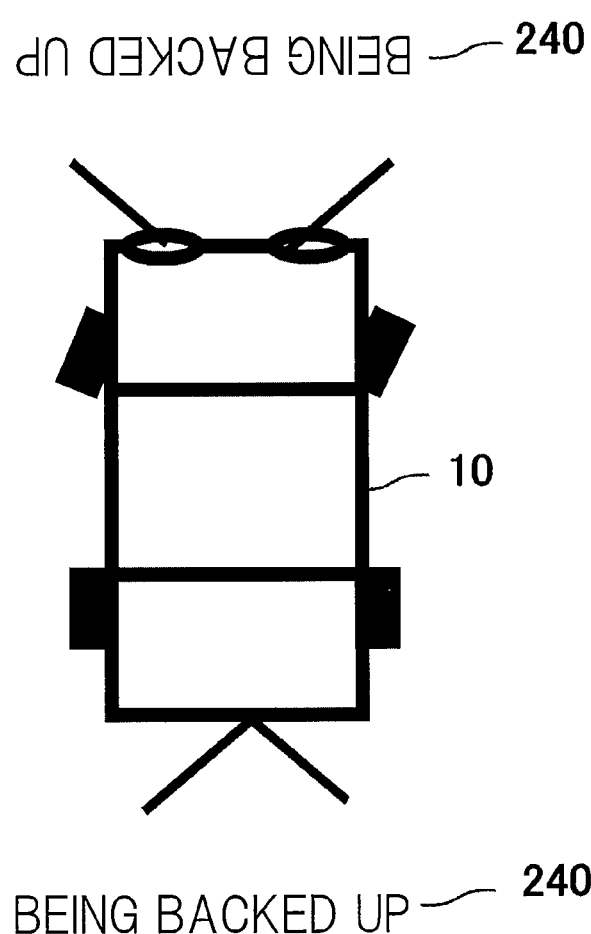

(A) IN LOW SPPED (B) IN HIGH SPEED

FIG. 20
AT STOP
(A)
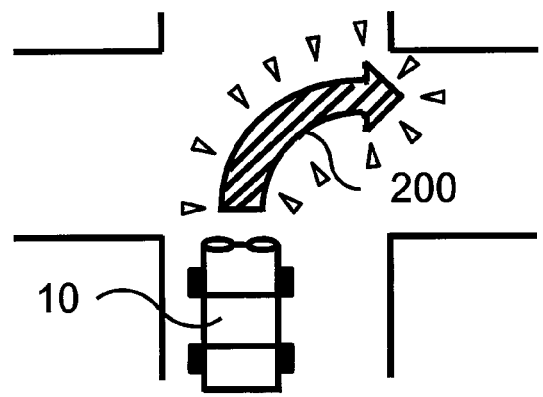
(B)
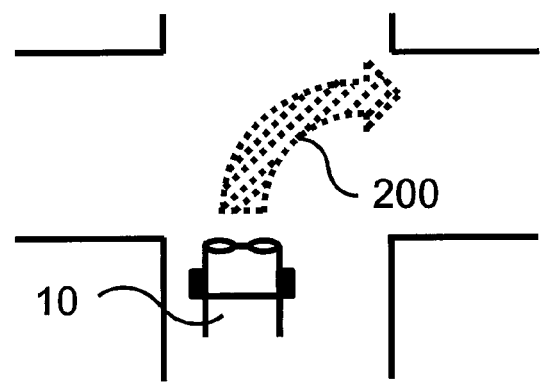
(C)
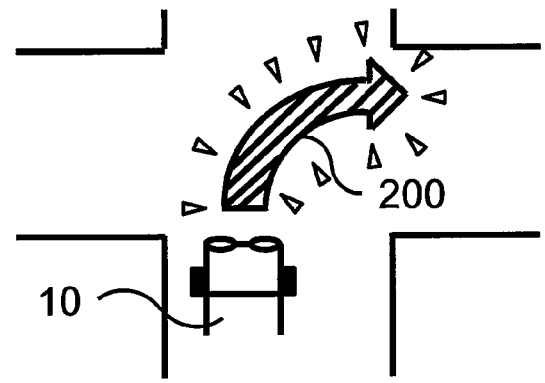

FIG. 21
AT START
(A)
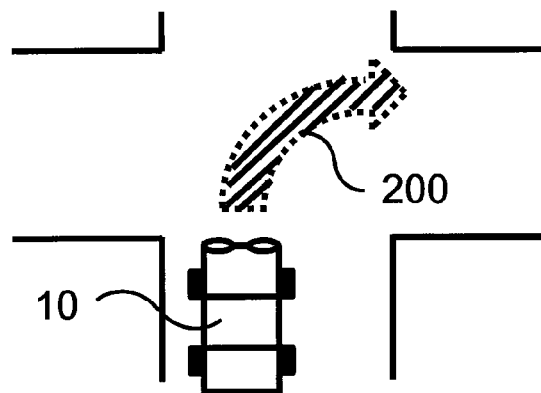
(B)
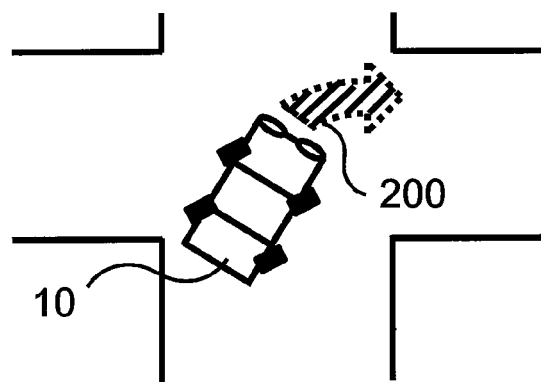
(C)
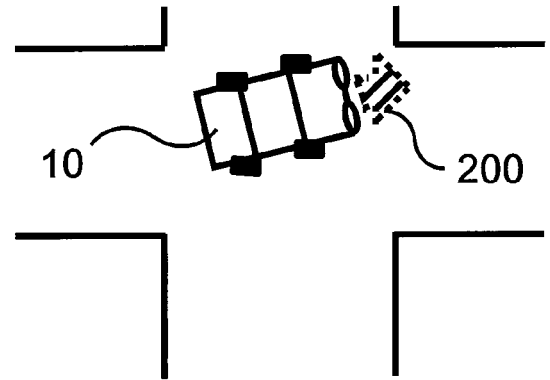

VEHICLE

CROSS REFERENCE

This application is a continuation under 35 U.S.C. § 111(a) of U.S. patent application Ser. No. 15/543,219, filed on Jul. 12, 2017, which in turn is the U.S. National Phase under 35 U.S.C. § 371 of International Application No. PCT/JP2015/084820, filed on Dec. 11, 2015, which claims the benefit of Japanese Application No. 2015-003961, filed on Jan. 13, 2015, and Japanese Application No. 2015-155164, filed on Aug. 5, 2015, the entire contents of each are hereby incorporated by reference.

TECHNICAL FIELD

The present invention relates to an image projection apparatus.

BACKGROUND ART

An image projection apparatus represented by a projector has already been used in a wide field as an apparatus for enlarging and projecting a desired image, and furthermore has been widely used also as a display device for a personal computer or a mobile phone in recent years.

For such an image projection apparatus, the following have already been known particularly as conventional techniques relating to use in a vehicle.

RELATED ART DOCUMENTS

Patent Documents

Patent Document 1: Japanese Patent Application Laid-Open No. 8-43781
Patent Document 2: Japanese Patent Application Laid-Open No. 2004-136838
Patent Document 3: Japanese Patent Application Laid-Open No. 2010-26759
Patent Document 4: Japanese Patent Application Laid-Open No. 2012-247369
Patent Document 5: Japanese Patent Application Laid-Open No. 2014-153868

SUMMARY OF THE INVENTION

Problems to be Solved by the Invention

That is, the aforementioned Patent Document 1 discloses a projection-type display apparatus using a headlight of a vehicle as an outside light source by arranging an LCD projector superior in portability without containing a light source ahead of the headlight serving as the outside light source. To solve its problem, Patent Document 2 also shows an embodiment for realizing: a first state of previously incorporating a projector at the front of a headlight and into a vehicle; and a second state of directly irradiating a light flux from the headlight onto the outside of the vehicle by moving the projector or the headlight, and for further displaying an image onto a road.

Furthermore, in Patent Document 3, known as a vehicle driving support apparatus is an apparatus in which to effectively alert an occupant of an own vehicle at a time of determination of lane departure, information for alerting the occupant by irradiation means (laser) attached to a headlight portion at the front of a vehicle is displayed on a road ahead of the vehicle.

According to Patent Document 4, it has already been known that a projector serving as projection means is attached to a head portion of a vehicle and projects a path guidance image to be guided to a branch direction onto a road surface ahead of the vehicle with setting of a projection angle based on path information searched for by a navigation system. In addition, according to Patent Document 5, already known has been a vehicle driving support apparatus which enables a traveling destination of an own vehicle to be recognized and thus enables appropriate driving by projecting a drawing pattern including a target mark and a tracking line onto a road surface ahead of the vehicle based on a traveling state of the own vehicle.

However, the aforementioned conventional techniques do not necessarily effectively display necessary information based on a traveling state or the like of the own vehicle.

Therefore, the present invention has been achieved in view of the problems in the aforementioned conventional technique, and is directed to providing an image projection apparatus capable of: projecting information onto a road surface, a wall surface, an own vehicle, or the like (hereinafter referred to as a road surface or the like); and displaying the projected information based on information about a vehicle such as a traveling state of the own vehicle (a moving body represented by an automobile or the like), for example.

Means for Solving the Problems

To solve the aforementioned problems, a configuration described in claims is, for example, adopted. The present application includes a plurality of means for solving the aforementioned problems. However, if one example of them is given, it is an image projection apparatus that projects an image and has: an acquisition unit that acquires information about a vehicle; and an image projection unit that projects the image based on the information acquired by the acquisition unit.

Effects of the Invention

According to the present invention, provided can be an image projection apparatus capable of projecting, based on information about a vehicle, the information onto a road surface or the like and displaying the projected information.

BRIEF DESCRIPTIONS OF THE DRAWINGS

FIG. 1 is a perspective view from a front of a vehicle which is loaded with an image projection apparatus according to one embodiment of the present invention to project an image onto a road surface or the like;

FIG. 2 is a perspective view from a rear of the vehicle which is loaded with the image projection apparatus according to the one embodiment of the present invention to project an image onto a road surface or the like;

FIG. 7 is a diagram illustrating a specific example of various types of images projected onto a road surface by a relationship with vehicle information from the aforementioned projector;

FIG. 12 is a diagram illustrating a specific example of various types of images projected onto a road surface by a relationship with vehicle information from the aforementioned image projector;

FIG. 15 is a diagram illustrating a specific example of various types of images projected onto a road surface by a relationship with vehicle information from the aforementioned projector;

Figure 3:
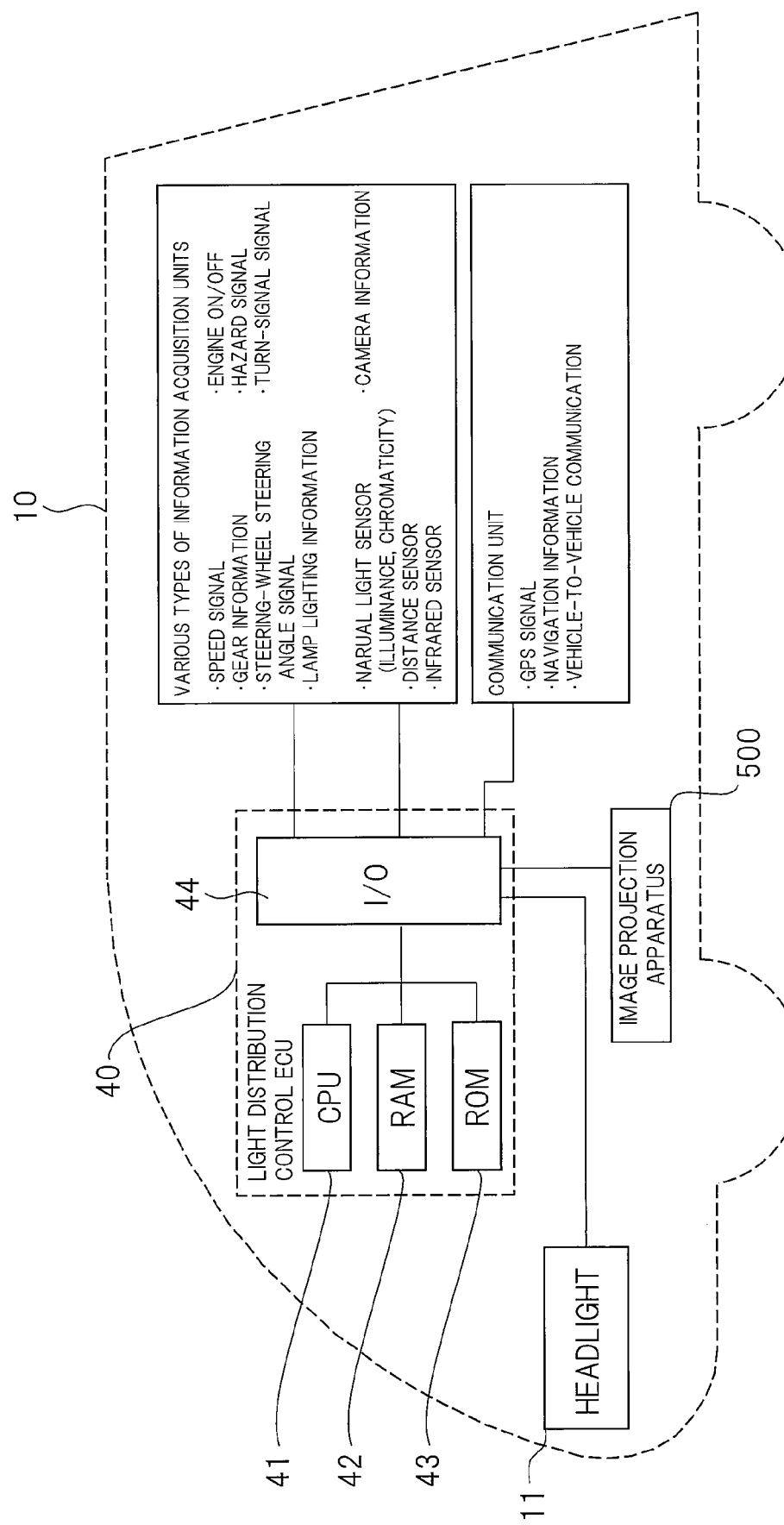
FIG. 3 is a diagram illustrating an entire configuration of a light distribution control ECU constituting the aforementioned image projection apparatus.

FIG. 20 is a diagram illustrating a specific example of an image that becomes another embodiment and that is projected onto a road surface by a relationship with vehicle information from the aforementioned projector; and FIG. 21 is a diagram illustrating a specific example of an image that becomes another embodiment and that is projected onto a road surface by a relationship with vehicle information from the aforementioned projector.

DETAILED DESCRIPTION OF PREFERRED EXAMPLES

For an embodiment of the present invention, its detailed contents will be described below with reference to the accompanying drawings.

<Arrangement of Image Projection Apparatus>

First, FIGS. 1(A) and 1(B) each illustrate a passenger vehicle 10 as an example of an own vehicle loaded with an image projection apparatus according to an embodiment of the present invention. As illustrated in the drawings, a pair of right and left headlights 11 is provided at a front of a main body of the passenger vehicle 10. In an example illustrated in FIG. 1(A), a lamp serving as a luminous body is incorporated into each of the pair of headlights 11 although its details are not illustrated. In the example illustrated in FIG. 1(A), the passenger vehicle 10 is loaded with image projection apparatuses described in detail below and configured as a left-and-right pair. Image light from the image projection apparatus is projected onto the front of the own vehicle via a transparent window, for example. Note that, in this example, an image projected onto a road surface or the like represents a current or subsequent traveling direction for a pedestrian or the like who is walking in the vicinity of the own vehicle, and thereby higher safety is ensured.

FIG. 1(B) illustrates an example in which only one image projection apparatus is loaded into a leading end of a vehicle body. In this case, image light from the image projection apparatus is projected, for example, forward from the own vehicle via a transparent window 12 provided at the leading end of the vehicle body.

Then, FIGS. 2(A) and 2(B) each illustrate a rear of the aforementioned passenger vehicle 10 loaded with the image projection apparatus according to the one embodiment of the present invention. As illustrated in the drawings, red tail lamps 13 and 13' are provided at the rear of the vehicle body. In this example illustrated in FIG. 2(A), a lamp serving as a luminous body is incorporated into each of the tail lamps 13 and 13' although its details are not illustrated. In the example illustrated in FIG. 2(A), the image projection apparatuses are loaded as a left-and-right pair, and image light from each of the image projection apparatuses is projected backward from the own vehicle via a transparent window, for example.

FIG. 2(B) illustrates an example in which the image projection apparatus is loaded into the vicinity etc. of a roof of the vehicle body, for example. In this example illustrated in FIG. 2(B), image light is projected backward from the own vehicle via a transparent window provided at a rear end of the vehicle body similarly to FIG. 1(B) as described above.

Incidentally, while the examples in which one or a plurality of (a pair of) image projection apparatuses are loaded into each of the front and the rear of the own vehicle have been described above, the present invention is not limited to these. For example, the image projection apparatus may be loaded into locations (e.g., a side mirror portion, a top of the roof, and a side surface and a bottom surface of the vehicle body, etc.) other than the front and the rear of the own vehicle. The image projection apparatus may be integrally incorporated into each of the headlights or the tail lamps. That is, in the present invention, a desired image may be able to be projected onto the road surface or the like by the image projection apparatus. Incidentally, if the image projection apparatus is incorporated into each of the headlights and the tail lamps, a light source of the headlight or the tail lamp can be also used as a light source for projection.

<Configuration of Light Distribution Control ECU>

Then, FIG. 3 illustrates an example of a configuration of an electronic control unit (light distribution control ECU) loaded into the aforementioned passenger vehicle 10. As apparent from this drawing, the light distribution control ECU 40 includes a CPU (Central Processing Unit) 41, and a RAM 42 and a ROM 43 each serving as storage means, and further includes an input/output device (I/O unit) 44. Inputted into the light distribution control ECU via the above IO unit 44 is information from various types of information acquisition units and a communication unit, and thereby driving of the aforementioned headlight 11 and image projection of an image projection apparatus 500 are controlled.

Note that examples of the information from the aforementioned various types of information acquisition units include: a speed signal representing a traveling speed of an own vehicle; a signal representing a state (ON/OFF) of an engine; gear information representing a position of a gear; a hazard signal for informing a surrounding driver of the presence of a danger; a steering-wheel steering angle signal representing a steering angle of a steering wheel; a turn-signal signal representing the presence or absence of turn signals (or also referred to as "blinkers") or indicating which of the right and left turn signals is lighting up/flashing; and further lamp lighting information representing a lighting/flashing state of each of the aforementioned various types of lamps.

Further examples of the information from the aforementioned various types of information acquisition units include: information (an illuminance signal and a chromaticity signal, etc.) from an outside light sensor which detects light outside a vehicle; image information from a camera attached to the vehicle; a signal from a distance sensor which detects a distance between an own vehicle and a vehicle or another object traveling around, e.g., ahead of the own vehicle; further a signal from an infrared sensor which detects an external condition of the vehicle at night; and the like.

Furthermore, examples of the information from the aforementioned communication unit include: a GPS (Global Positioning System) signal for determining a position of the own vehicle; so-called navigation information serving as information from a navigation device which performs route guidance or the like; information about vehicle-to-vehicle communication performed between a vehicle and another vehicle and road-to-vehicle communication performed between a road and a vehicle; and the like.

Figure 4:
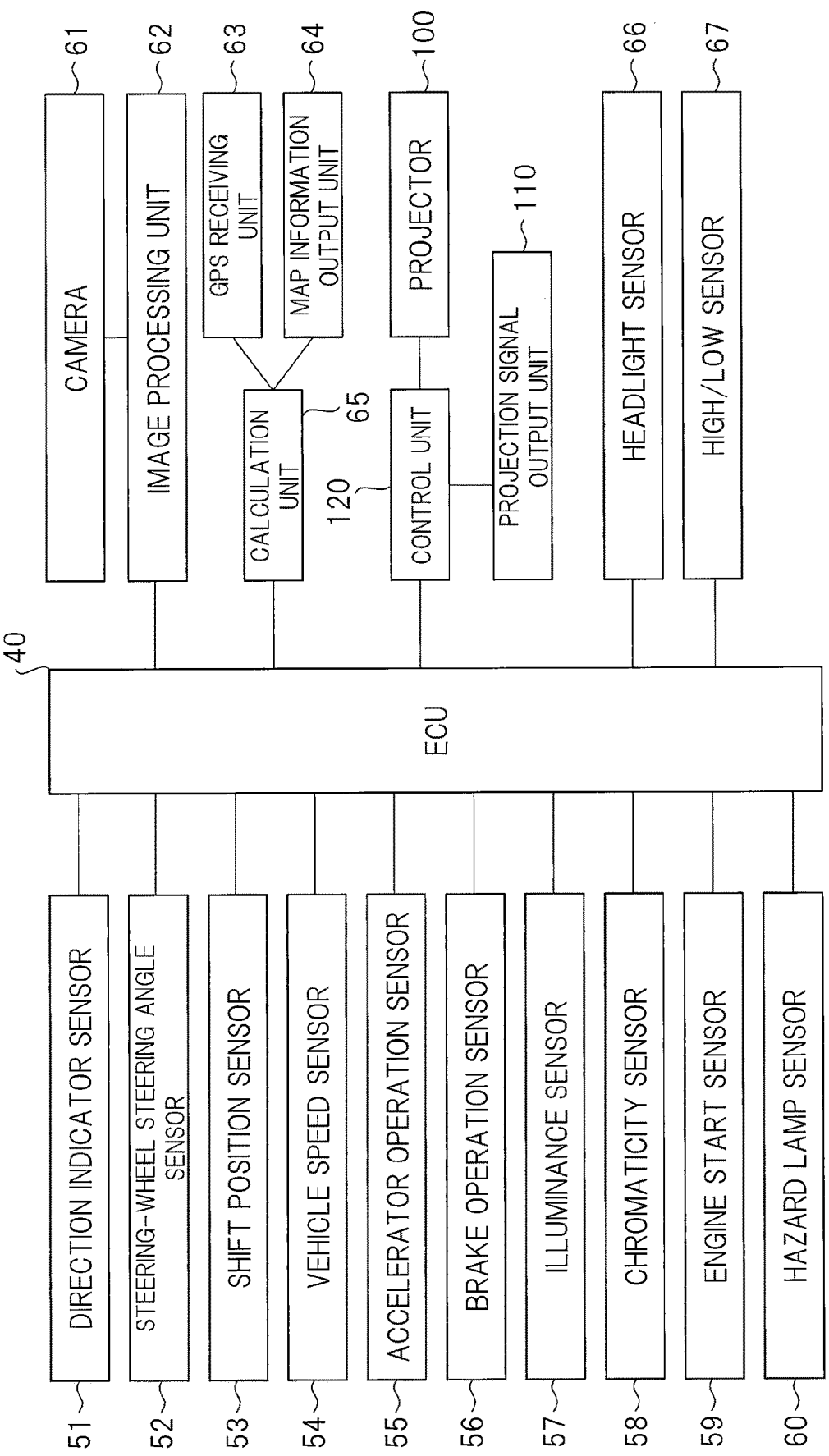
FIG. 4 is a block diagram illustrating an example of a further detailed configuration of the aforementioned light distribution control ECU and its peripheral elements.

FIG. 4 illustrates a further detailed configuration of the aforementioned light distribution control ECU 40 and its peripheral elements. That is, in FIG. 4, respective signals from a direction indicator sensor 51, a steering-wheel steering angle sensor 52, a shift position sensor 53, a vehicle speed sensor 54, an accelerator operation sensor 55, a brake operation sensor 56, an illuminance sensor 57, a chromaticity sensor 58, an engine start sensor 59, and a hazard lamp sensor 60 are inputted to the aforementioned light distribution control ECU 40. Further, a signal from a camera 61 is inputted to the ECU 40 via an image processing unit 62, and respective signals from a GPS receiving unit 63 and a map information output unit 64 are inputted to the ECU 40 via a calculation unit 65.

A control signal from the aforementioned light distribution control ECU 40 and a signal (an image signal to be projected onto the road surface or the like) from a projection signal output unit 110 are inputted to a projector 100 constituting the aforementioned image projection apparatus via a control unit 120. Thus, an image is projected onto the road surface or the like as described below.

In addition, respective signals from a headlight sensor 66 and a high/low sensor 67 are further inputted to the aforementioned light distribution control ECU 40.

<Image Projection Apparatus>

Figure 5:
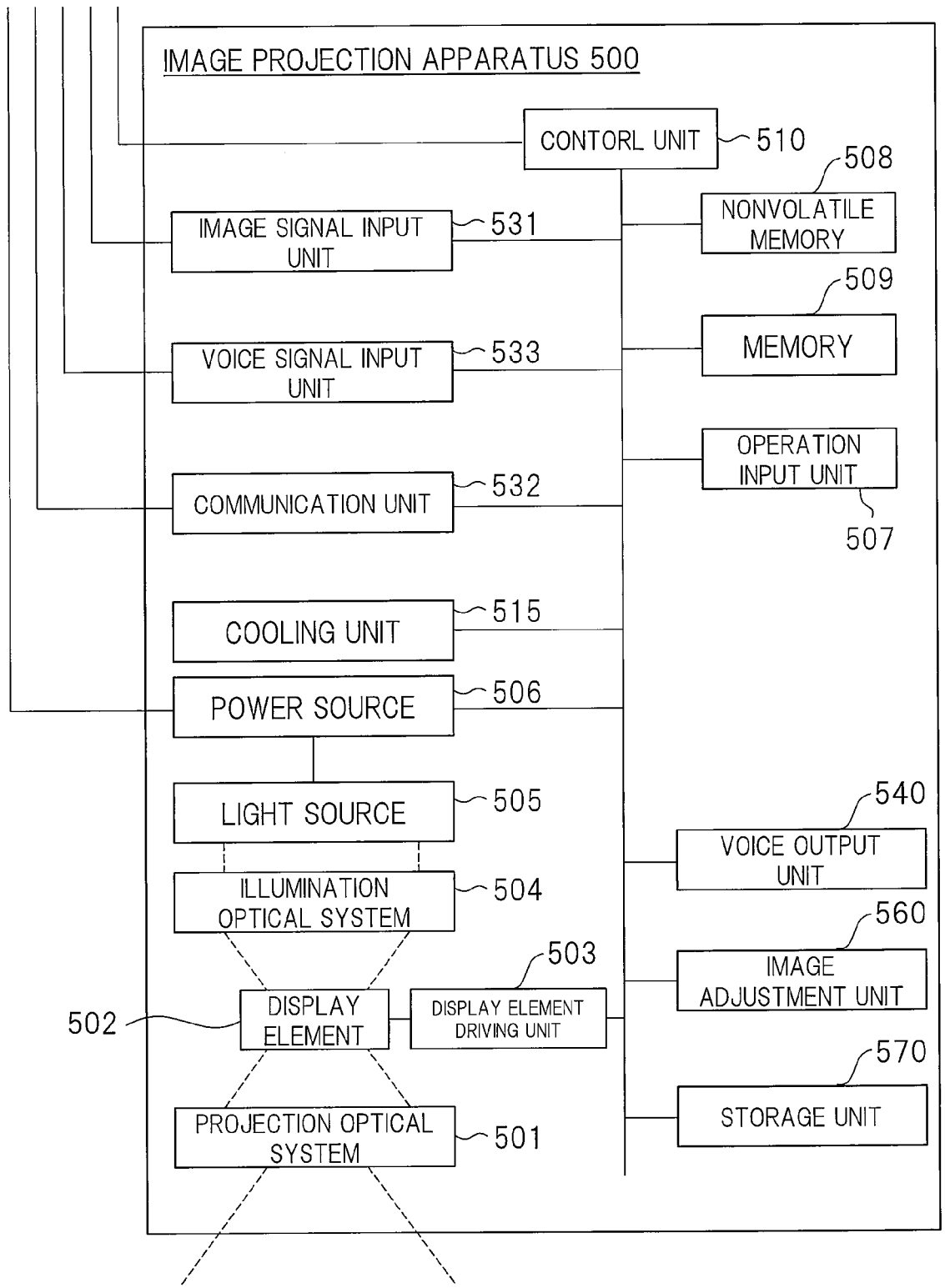
FIG. 5 is a diagram illustrating an example of a configuration of the image projection apparatus according to the one embodiment of the present invention.

Then, an example of a further detailed configuration of the image projection apparatus 500 including the projector 100, the projection signal output unit 110, and the control unit 120 illustrated in FIG. 4 as described above will be described in detail below with reference to FIG. 5.

A projection optical system 501 is an optical system which projects an image onto a road surface or the like, and includes a lens and/or a mirror. A display element 502 is an element which modulates transmitted light or reflected light to generate an image, and its examples include a transmissive liquid crystal panel, a reflective liquid crystal panel, and a DMD (Digital Micromirror Device: registered trademark) panel, etc. A display element driving unit 503 feeds a driving signal to the display element 502, and generates an image in the display element 502. A light source 505 generates light for image projection, and its examples include a high-pressure mercury lamp, a xenon lamp, an LED light source, and a laser light source, etc. A power source 506 supplies power to the light source 505. Further, the power source 506 supplies power required for each of other units. The illumination optical system 504 collects light generated by the light source 505, makes the light more uniform, and irradiates it to the display element 502. A cooling unit 515 cools each of parts which becomes a high-temperature state such as the light source 505, the power source 506, or the display element 502 as the need arises using an air cooling system or a liquid cooling system. An operation input unit 507 is a light receiving unit in an operation button or a remote control, and inputs an operation signal from a user.

An image signal input unit 531 is connected to an external image output device, and inputs image data. A voice signal input unit 533 is connected to an external voice output device, and inputs voice data. A voice output unit 540 can perform a voice output based on the voice data inputted to the voice signal input unit 533. The voice output unit 540 may output an operation sound or error warning sound built therein. A communication unit 532 is connected to an external information processing apparatus, for example, and inputs and outputs various types of control signals thereto and therefrom.

A nonvolatile memory 508 stores various types of data used in a projector function. The data stored in the nonvolatile memory 508 include image data and image data previously prepared to be projected onto a road. A memory 509 stores image data to be projected, respective control parameters for the units in the apparatus, and the like. A control unit 510 controls an operation of each of the units to be connected thereto.

An image adjustment unit 560 performs an image processing to the image data inputted to the image signal input unit 531 and the image data and the image data stored in the nonvolatile memory 508. Examples of the image processing include: a scaling processing for enlarging, reducing, and deforming, for example, an image; a brightness adjustment processing for changing luminance; a contrast adjustment processing for changing a contrast curve of the image; and a retinex processing for decomposing the image into light components and changing weighting for each of the components.

A storage unit 570 records a video, an image, a voice, various types of data, and the like. For examples, a video, an image, a voice, various types of data, and the like may be previously recorded at a time of product delivery, or a video, an image, a voice, various types of data, and the like acquired from an external apparatus, an external server, and the like via the communication unit 532 may be recorded. The video, the image, the various types of data, and the like recorded in the storage unit 570 may be respectively outputted as projected images via the display element 502 and the projection optical system 501. The voice recorded in the storage unit 570 may be outputted as a voice from the voice output unit 540.

As described above, various functions can be put on the image projection apparatus 500. However, the image projection apparatus 500 need not necessarily have all the aforementioned components. The image projection apparatus 500 may have any configuration if it has a function of projecting an image.

Figure 6:
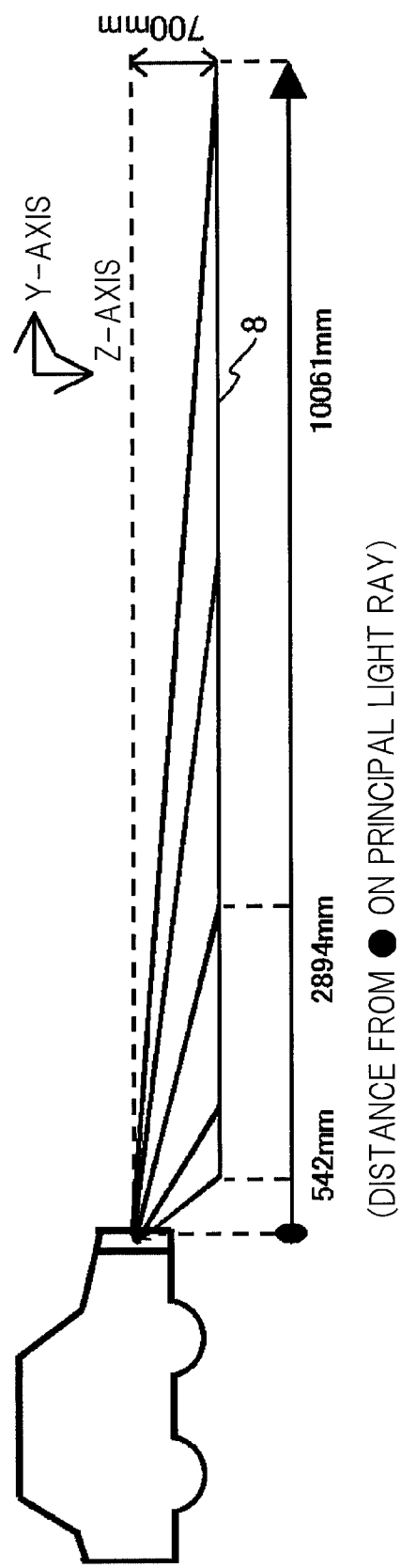
FIG. 6 is a light ray diagram also including an image surface of the aforementioned projector.

FIG. 6 is a light ray diagram of the projector also including an image surface. In FIG. 6, image light, which has been emitted from a light source including an LED (not illustrated) etc. and penetrated an image display element, passes through a filter or the like, and is projected onto an image surface 8 (a road surface etc.) after being subjected to a refraction function by various types of lens systems and further to a reflection function according to a configuration. Thus, in the aforementioned image projection apparatus 500, a length of a long side in a range of a projected image is 10061−542=9519≈9520 mm relative to a projection distance of 700 mm. Therefore, a projection ratio is 700/9520≈0.07, and a significantly wider angle than ever before is realized.

Incidentally, while the one image projection apparatus 500 and the projection optical system therein have been described above, one or a plurality of (a pair of) projectors may be loaded into a vehicle (or integrally incorporated into each of headlights and tail lamps) to project a desired image onto a road surface or the like as described above. At that time, when a plurality of (a pair of) image projection apparatuses are used as particularly illustrated in FIG. 1(A) and FIG. 2(A), as described above, the same image may be projected onto the road surface or the like from the image projection apparatuses (in this case, the same image is displayed on the display elements 502 illustrated in FIG. 5), or different images may be respectively projected from the right and left image projection apparatuses and synthesized on the road surface or the like (in this case, right and left images obtained by dividing a desired image are respectively displayed on the display elements 502 illustrated in FIG. 5).

While a configuration in which a transmission-type liquid crystal image display element is used as the image projection apparatus projecting the image onto the road surface or the like has been described above, the present invention is not limited to this. Other examples of the image projection apparatus can include various types of image projection apparatuses such as: a reflection-type image projection apparatus including a micromirror such as a DLP (Digital Light Processing) apparatus; and an image projection apparatus capable of projecting image light from a planar light emitting diode capable of light modulation via a projection optical system. That is, in the present invention, the image projection apparatus may be able to project the desired image onto the road surface or the like.

<Image Projected onto Road Surface or the Like>

The image projection apparatus whose details have been described above is then loaded into the front and/or the rear of the vehicle body as described above as an example. Thus, a specific example of various types of images projected onto the road surface or the like by a relationship with vehicle information will be described in detail below with reference to FIGS. 7 to 19.

FIG. 7 illustrates an example of projecting an arrow onto a road surface ahead of the vehicle when a direction indicator (also referred to as a blinker or a turn signal) is lighted/flashed in a right turn/left turn in driving the vehicle 10. In this case, the image projection apparatus projects an arrow 200 serving as an image representing a traveling direction of the own vehicle onto the road surface ahead of the vehicle based on the signal from the direction indicator sensor 51 illustrated in FIG. 4 described above (FIG. 7(A)). Concurrently, the image projection apparatus further flashes the arrow 200 projected onto the road surface ahead of the own vehicle based on a traveling speed of the own vehicle inputted from the vehicle speed sensor 54 and a steering angle of the steering wheel inputted from the steering-wheel steering angle sensor 52 (FIG. 7(B)). Incidentally, at this time, the arrow 200 may be interlocked with (synchronized with or alternated with) the flashing of the turn signal, or a period in which the arrow 200 is flashed is made variable so that a period of the flashing can also be set depending on the inputted traveling speed and steering-wheel steering angle.

According to the image projected onto the road surface or the like, by setting a display method (in this case, the flashing or the flashing period) based on not only the traveling direction of the own vehicle but also driving information (in this case, a vehicle speed and the steering-wheel steering angle) on the own vehicle for a driver of another vehicle or a pedestrian existing around the own vehicle, a presentation (warning) is made more surely to the surrounding driver or pedestrian, and high safety can be ensured. At this time, if the pair of image projection apparatuses is incorporated as illustrated in the examples of FIGS. 1(A) and 2(A), the respective projected images are combined to display a large image, so that the safety can be further enhanced, and different projected images and pieces of information can also be respectively displayed onto different targets. Incidentally, while this has been described using the arrows in the examples, the present invention is not limited to this. A shape, character information, or the like representing a direction may be used. Although an example of projecting the mark itself to be displayed has been illustrated in the embodiment, a peripheral portion excluding the mark may be projected to display the reversed mark.

Figure 8:
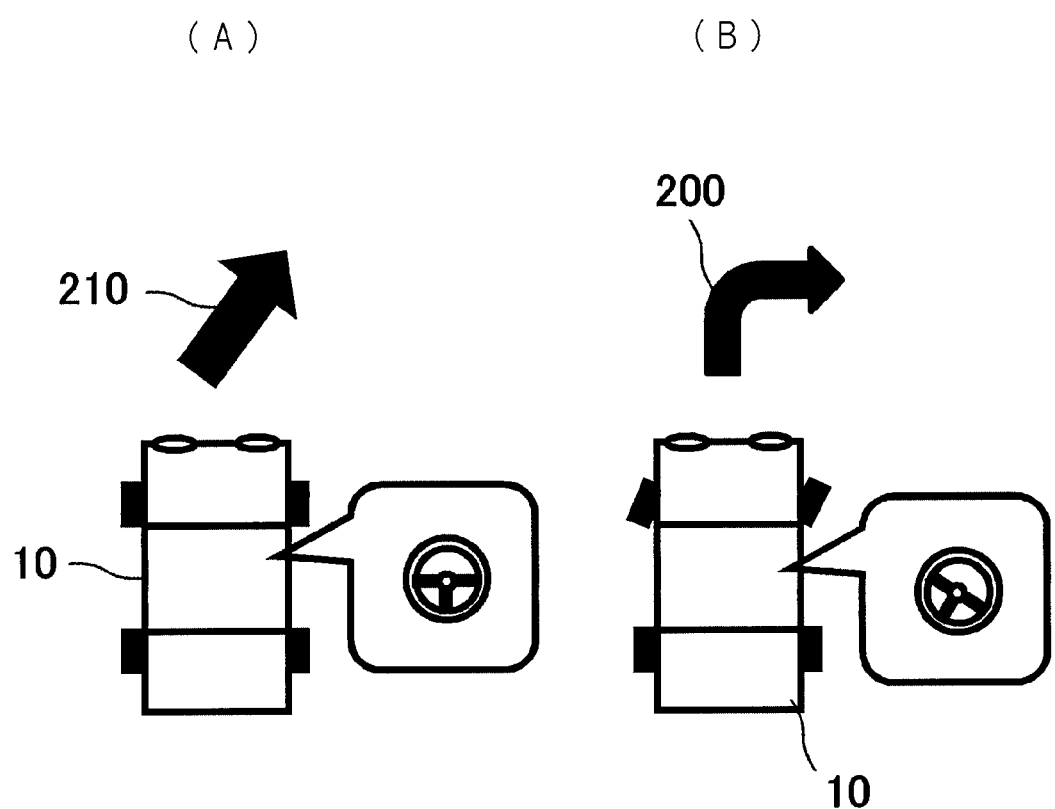
FIG. 8 is a diagram illustrating a specific example of various types of images projected onto a road surface by a relationship with vehicle information from the aforementioned projector.

Furthermore, as also illustrated in FIG. 8, a curved state of an arrow may be changed depending on a steering wheel operation of a driver. That is, for example, if an arrow indicating a traveling direction of a vehicle is a linear arrow 210 (FIG. 8(A)) before the driver actually performs the steering wheel operation, and if the arrow is a curved arrow 200 (FIG. 8(B)) corresponding to a steering angle in actually performing the steering wheel operation, driving information about the vehicle can be more reliably presented to a surrounding driver or pedestrian.

Furthermore, in the aforementioned drawings, their display contents are replaced with the aforementioned arrow, for example, a mark 230 for announcing a danger (see FIG. 15(A) described below) or an entrance track 220 composed of a curved line (see FIG. 12(B) described below), and by changing further its display position, its display can be also performed (e.g., at a position separated according to a traveling speed or a position moved in a steering direction). In addition, if the blinker is lighted/flashed in a right turn/left turn, the arrow 200 having the same color as that of the turn signal can also be lighted/flashed, or a display position of the mark (the arrow 200) can also be changed (moved to the left or to the right) in a right turn/left turn. Further, the presence or absence of lighting/flashing of the blinker may be detected. If the blinker is interlocked with the steering wheel and is lighting up/flashing, right-turn/left-turn display can also be performed by the aforementioned arrow 200.

Figure 9:
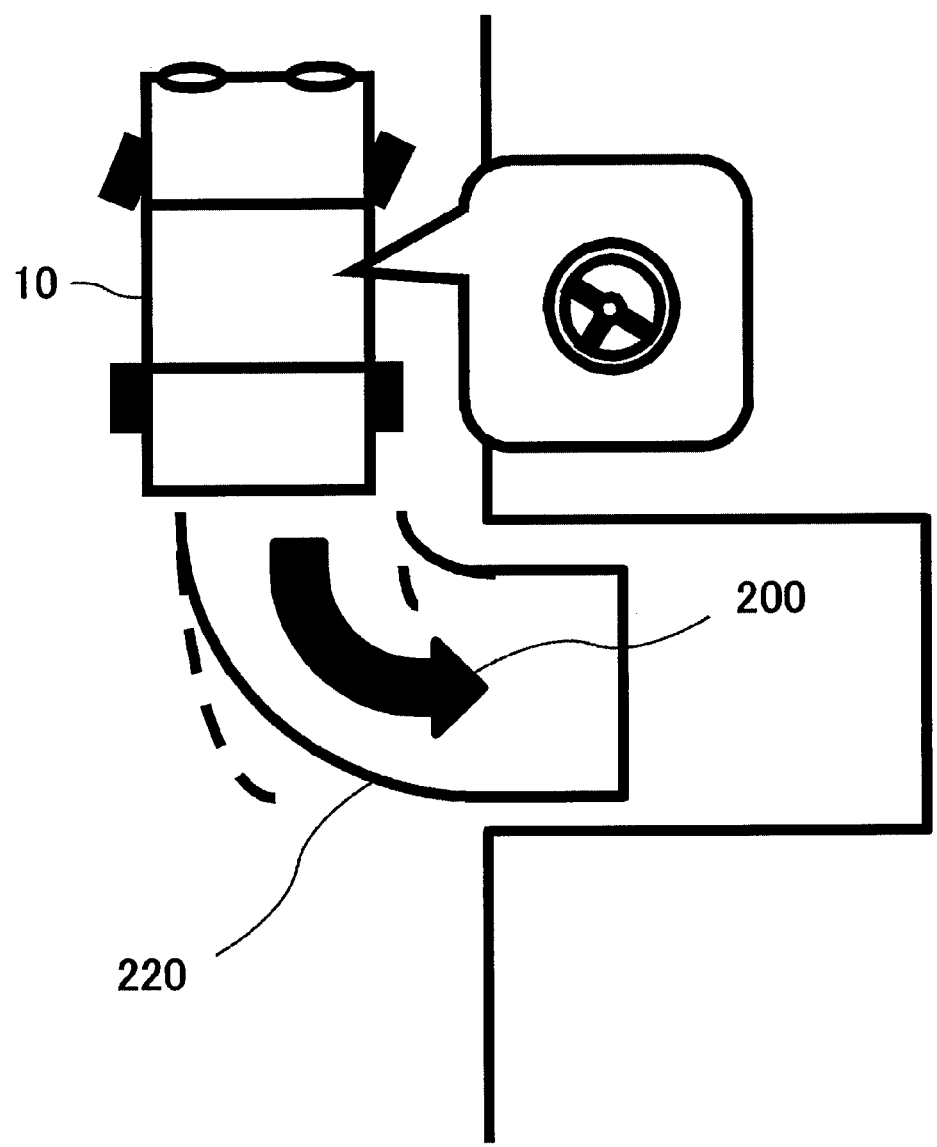
FIG. 9 is a diagram illustrating a specific example of various types of images projected onto a road surface by a relationship with vehicle information from the aforementioned projector.

FIG. 9 illustrates an example of displaying a case where the steering wheel is operated in putting the own vehicle 10 into a garage, and displaying an arrow 200 indicating a traveling direction behind the own vehicle 10 and a rectangular frame 220 for displaying a traveling range of the own vehicle 10. Note that, in this case, only the arrow 200 or only the rectangular frame 220 may be displayed. Further, a mark 230 (see FIG. 15(A) described below) or the like for announcing a danger may be displayed instead of an arrow depending on a steering angle.

According to such an image projected onto a road surface or the like, a presentation (warning) is made more surely to a surrounding driver or pedestrian particularly in putting the own vehicle into a garage, and high safety can be ensured.

Figure 10:
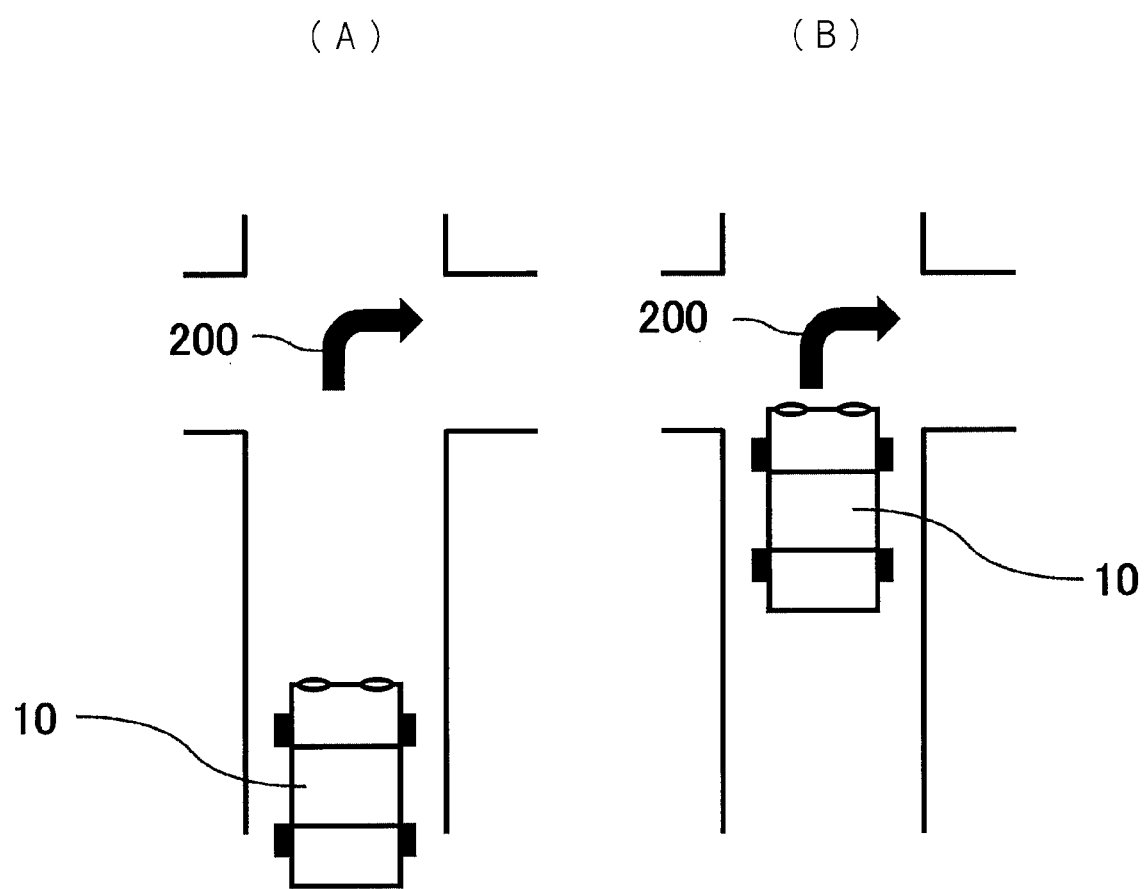
FIG. 10 is a diagram illustrating a specific example of various types of images projected onto a road surface by a relationship with vehicle information from the aforementioned projector.
Figure 11:
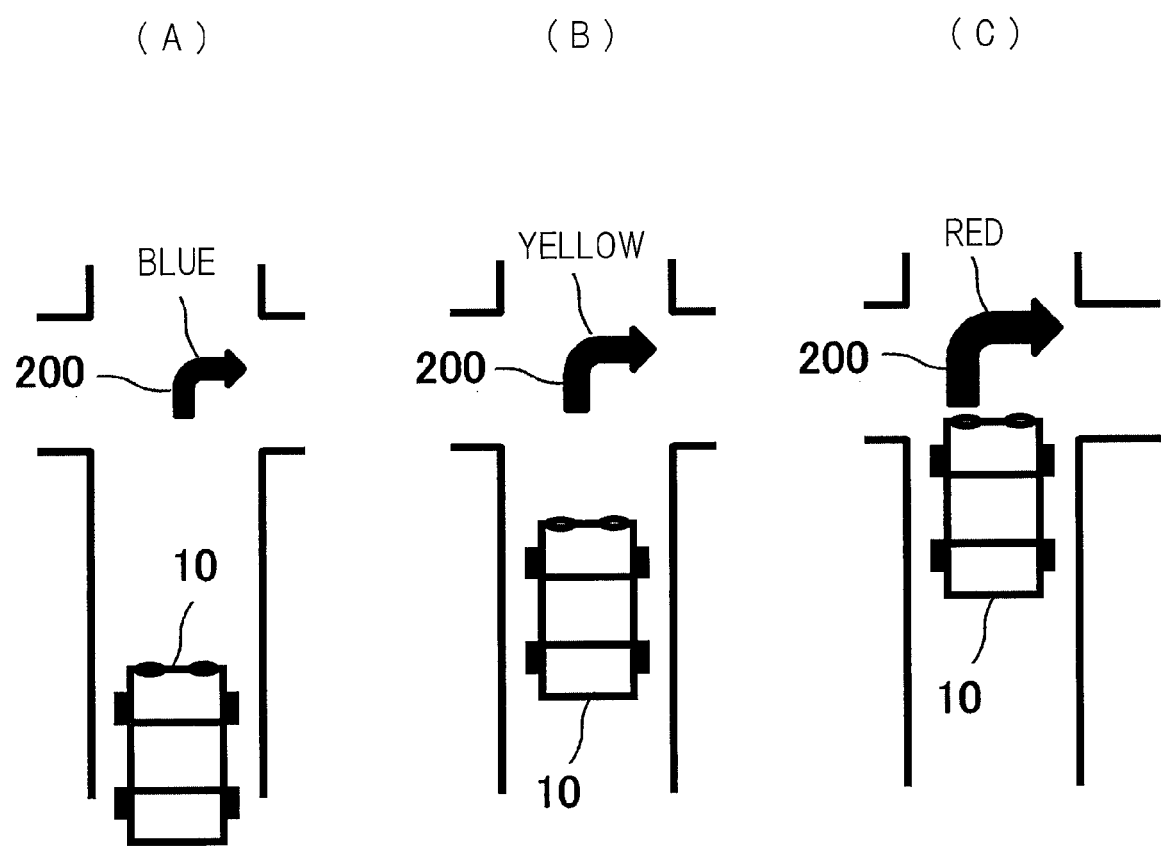
FIG. 11 is a diagram illustrating a specific example of various types of images projected onto a road surface by a relationship with vehicle information from the aforementioned projector.

Then, FIG. 10 illustrates, similarly to the foregoing, an example of being interlocked with a GPS or a navigation system to change a distance from the own vehicle to a display position of the mark (the arrow 200) depending on a distance from the own vehicle to an intersection when the blinker is lighted/flashed in a right turn/left turn. In this example, if the distance from the own vehicle 10 to the intersection is long, the mark (the arrow 200) is displayed far. As the own vehicle 10 comes closer to the intersection, its display position is set to come closer to the own vehicle 10, i.e., depending on the distance from the own vehicle to the intersection.

In the aforementioned examples, a color or a shape of the mark (the arrow 200) can also be changed depending on the distance therefrom to the intersection. For example, as illustrated in FIGS. 11(A) to 11(C), the size of the mark (the arrow 200) (more specifically, an "L"-shaped right-turn/left-turn arrow 200) can be gradually increased depending on the distance therefrom to the intersection, or the color of the mark (the arrow 200) can also be changed to blue→yellow→red. Further, the mark (the arrow 200) can be also large-displayed/flashed.

According to the image projected onto the road surface or the like, higher safety can be ensured because the traveling direction of the own vehicle is easier to recognize by the surrounding driver or pedestrian, and the path which the own vehicle is to enter at the intersection is also easier to recognize by the driver of the own vehicle.

Particularly if a plurality of vehicles travel side by side on a relatively wide road, a mark (linear arrow) 210 may be displayed so as to extend also onto a road surface of an adjacent lane as also illustrated in FIG. 12(A). Or, an entrance track 220 composed of a plurality of (two in this example) straight lines or curved lines obliquely curved and parallel to one another for displaying its track may be displayed instead of the arrow as illustrated in FIG. 12(B). In these cases, particularly when the lane is changed, a traveling direction of an own vehicle can be recognized (warned) more surely to a driver of a following vehicle which travels on the adjacent lane, and thereby high safety can be ensured. Incidentally, at this time, if the blinker is lighted/flashed according to a lane change, a lighting/flashing time period of the blinker is shorter than that at the time of a right turn/left turn. Therefore, a case where the aforementioned projection display is not performed in time or a projection time period is too short is assumed. In such a case, however, a processing method performed until the projection display is performed can be simplified (e.g., reduction etc. in the number of steps) to reduce a time difference, or the projection display can be continued during a predetermined time period or more (the projection display is not turned OFF during a predetermined time period even if the blinker is turned OFF, for example) to correspond to a short projection time period. Alternatively, a case where an operation for indicating the blinker has been erroneously performed is assumed. If the blinker is not lighted/flashed during a predetermined time period or more, the projection display may not be performed.

An image projected onto a road surface or the like using an image signal, which is captured by the camera 61 illustrated also in FIG. 4 described above and inputted to the light distribution control ECU 40 via the image processing unit 62, will be described below.

Figure 13:
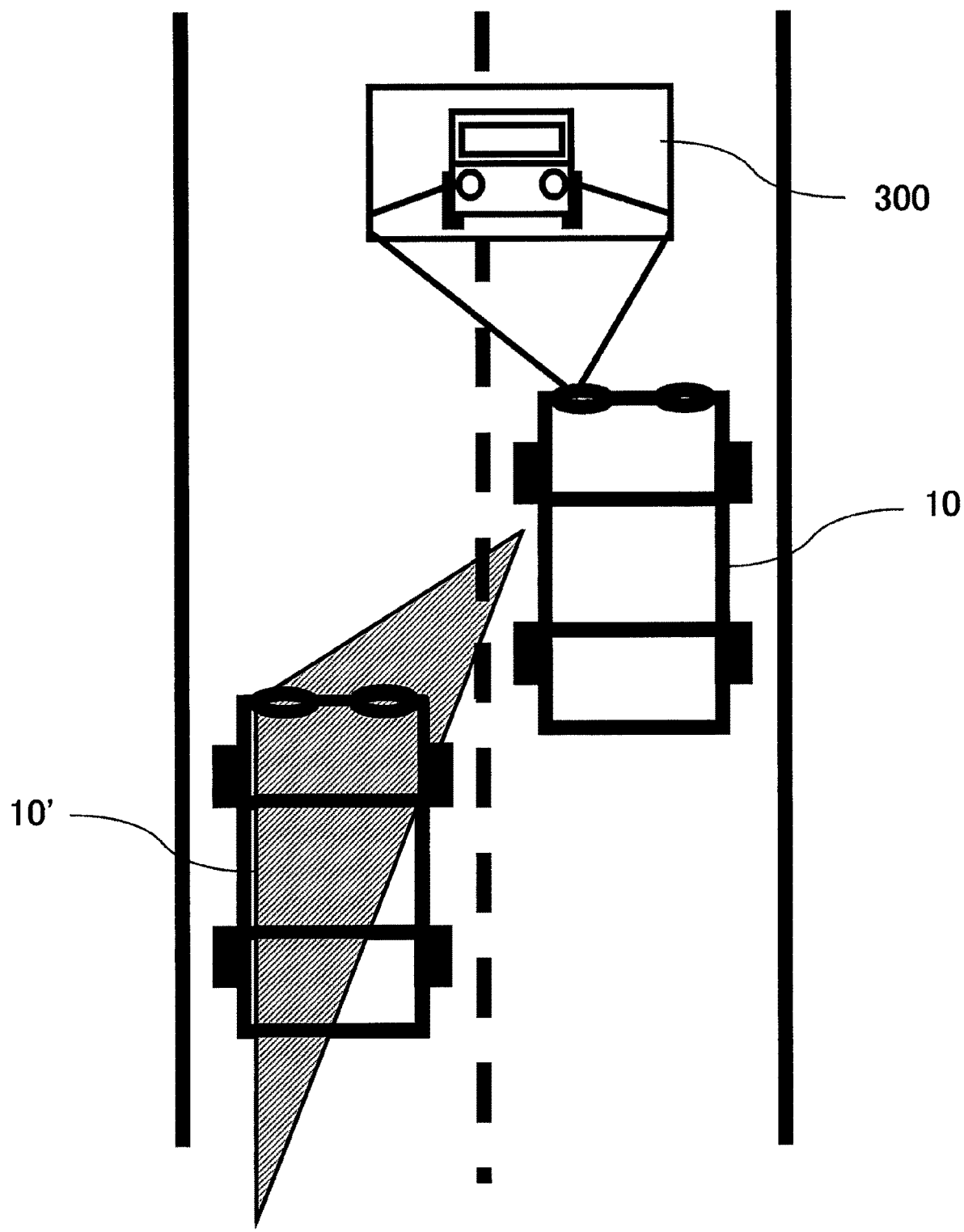
FIG. 13 is a diagram illustrating a specific example of various types of images projected onto a road surface by a relationship with vehicle information from the aforementioned projector.

As also illustrated in FIG. 13, on the own vehicle 10, a side surface region (a region indicated by a shaded area on a left side surface of the vehicle in the drawing) to be a driver's blind spot is captured by the camera 61. If another vehicle 10' which travels behind the own vehicle in an adjacent lane serving as the blind spot region is detected, the ECU 40 in the own vehicle 10 projects an image 300 of the another vehicle 10' which travels behind the own vehicle is projected onto a road surface or the like ahead of the own vehicle in a traveling direction instead of the aforementioned mark such as the arrow.

Such display of the image 300 can contribute to safe driving particularly at the time of a lane change because a driver who is driving can surely recognize (see) the another vehicle 10' traveling therebehind, which is usually difficult to see.

Figure 14:
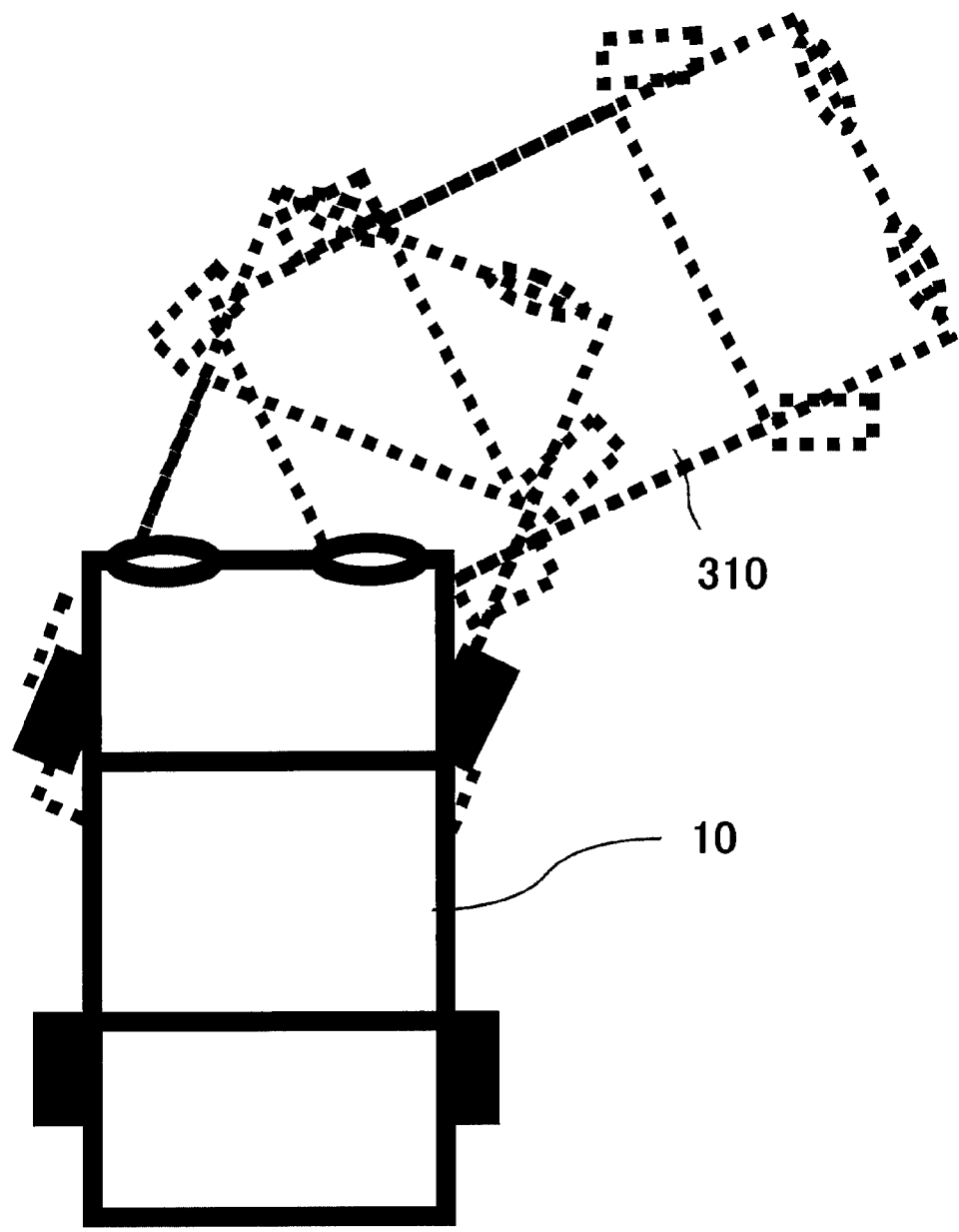
FIG. 14 is a diagram illustrating a specific example of various types of images projected onto a road surface by a relationship with vehicle information from the aforementioned projector.

As also illustrated in FIG. 14, when the own vehicle 10 in a parking state starts moving if an image 310 of the own vehicle is projected onto the road surface or the like toward a direction in which the own vehicle attempts to start moving, a presentation (warning) is made more surely to a surrounding driver or pedestrian, and higher security can be ensured.

Furthermore, as also illustrated in FIG. 15, if the own vehicle 10 is backed up or if attention attraction is interlocked with a hazard, a mark 230 for announcing a danger is projected onto a road surface or the like behind the vehicle (FIG. 15(A)) or characters 240 of "being backed up" may be projected onto road surfaces or the like ahead of or behind the vehicle (FIG. 15(B)). According to the projection of such an image, presentation (warning) is made more surely to a surrounding driver or pedestrian is made more surely particularly at the parking, and higher security can be ensured.

Figure 16:
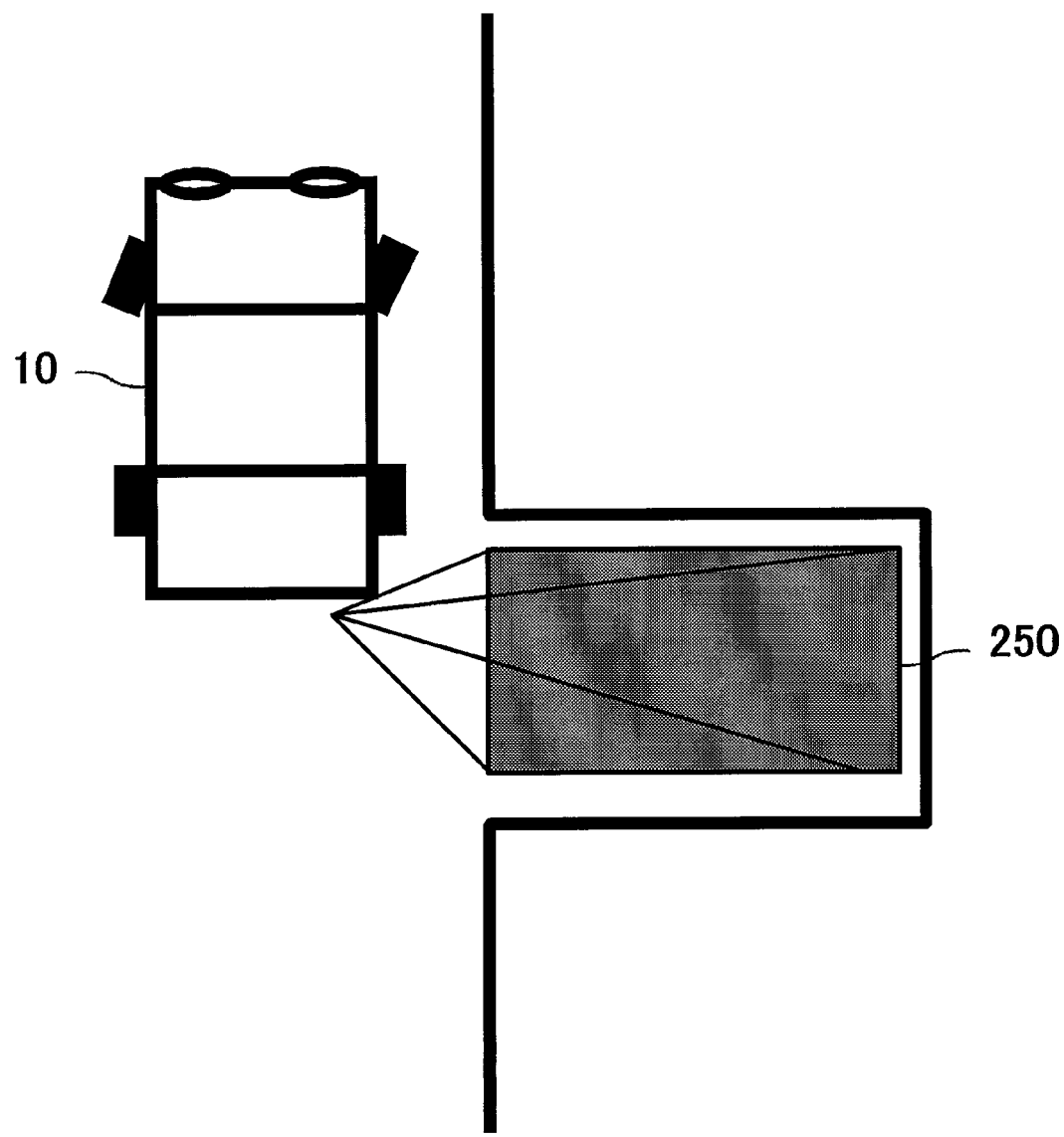
FIG. 16 is a diagram illustrating a specific example of various types of images projected onto a road surface by a relationship with vehicle information from the aforementioned projector.

As illustrated in FIG. 16, when the own vehicle 10 is backed up (is traveled back) for parking, for example, a mark 250 (e.g., a rectangular red face etc.) representing a space for parking can also be displayed by being projected at a position where the own vehicle is to be parked.

Figure 17:
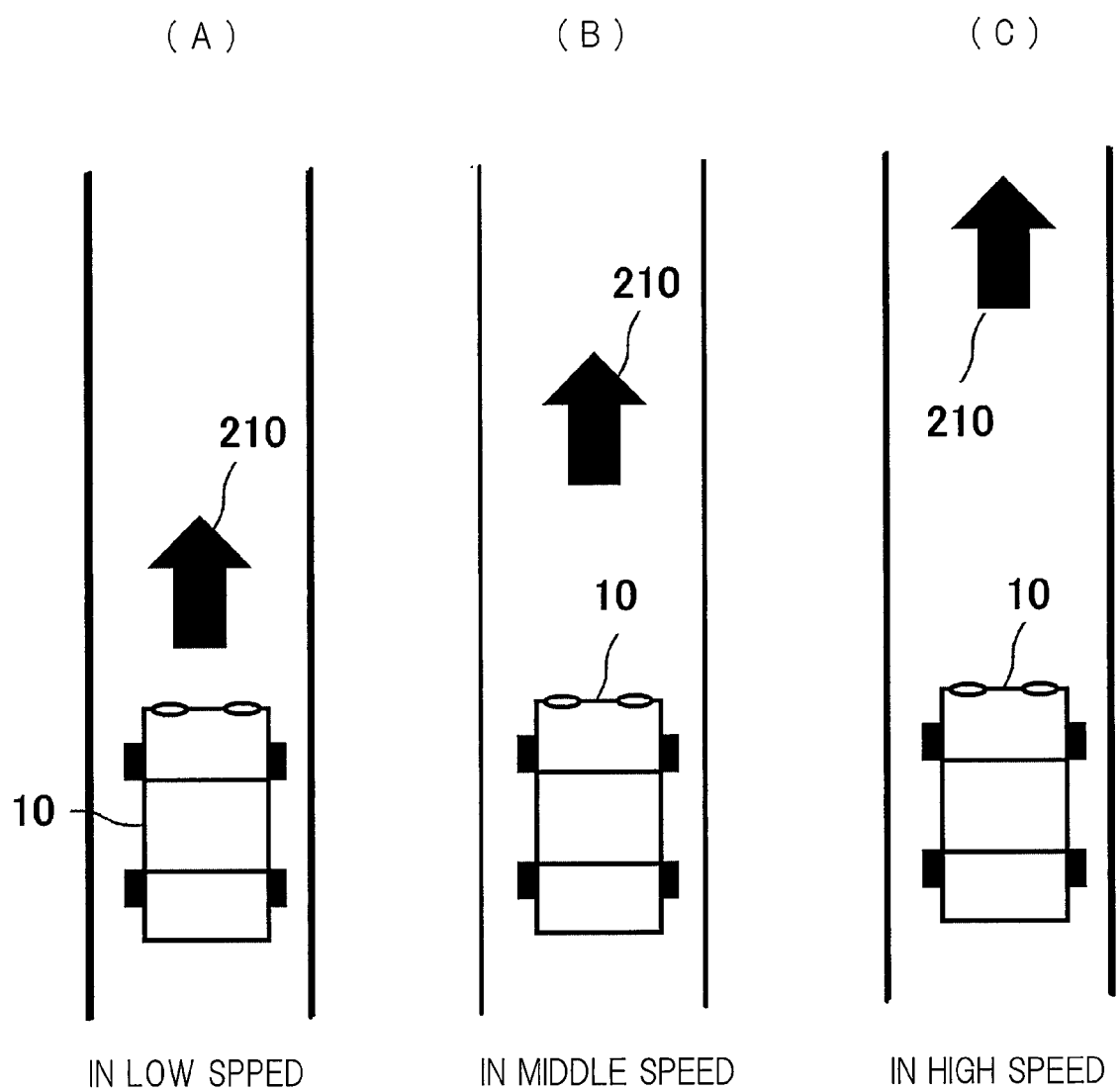
FIG. 17 is a diagram illustrating a specific example of various types of images projected onto a road surface by a relationship with vehicle information from the aforementioned projector.

In addition, at times of traveling in a tunnel, along an expressway, along a general road, and the like, the display content can also be changed. For example, as also illustrated in FIG. 17, a driver's gazing point changes depending on a traveling speed, and so a linear arrow 210 may be projected at a projection distance set depending on the traveling speed of the own vehicle 10. For example, the arrow 210 is projected at a short distance in a low speed (FIG. 17(A)), in a medium distance at the time of a medium speed, and at a far distance in a high speed (FIG. 17(C)).

Figure 18:
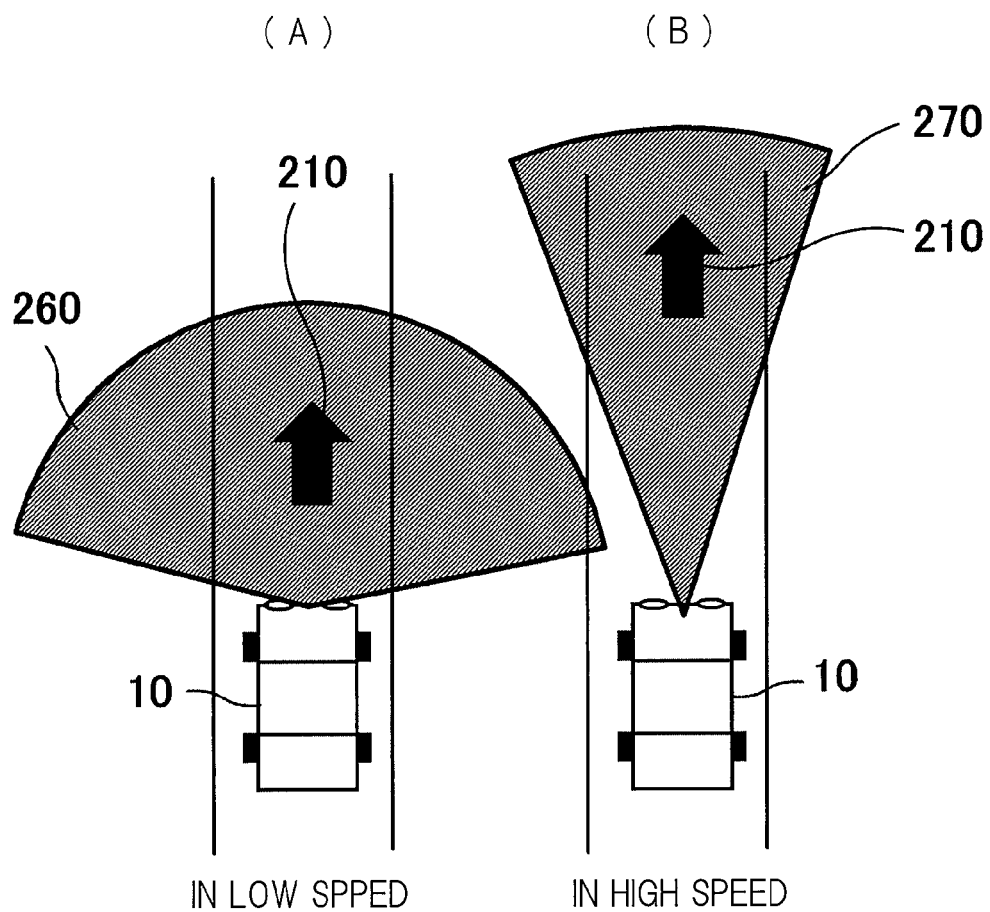
FIG. 18 is a diagram illustrating a specific example of various types of images projected onto a road surface by a relationship with vehicle information from the aforementioned projector.

Furthermore, as illustrated in FIG. 18, a driver's view angle changes depending on a traveling speed (the higher the traveling speed is, the narrower the driver's view angle becomes, for example, so that the view angle is 100 degrees at a speed of 40 km an hour, and 40 degrees at a speed of 100 km an hour). Therefore, since a range of the view angle becomes wide (a shaded area 260 in FIG. 18(A)) in the low speed, wide angle display may be set to match this, and since a range of the view angle becomes narrow (a shaded area 270 illustrated in FIG. 18(B)) in the high speed, display may be set to match this.

Figure 19:
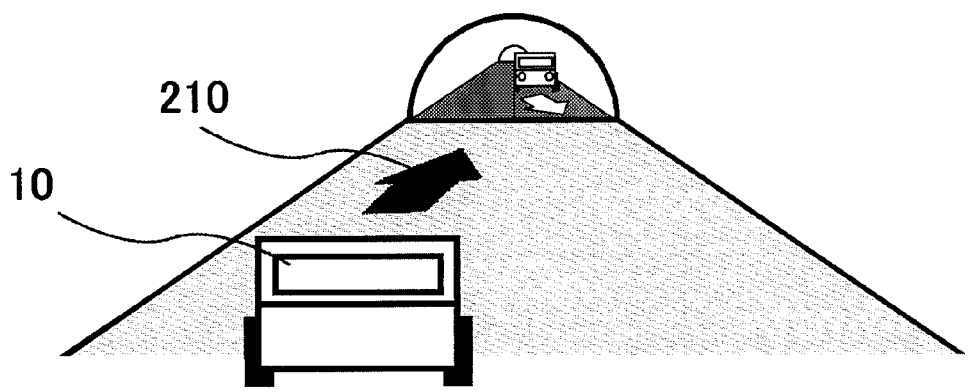
FIG. 19 is a diagram illustrating a specific example of various types of images projected onto a road surface by a relationship with vehicle information from the aforementioned projector.

Particularly at the time of traveling in a tunnel, the display content can also be made different from those at the time of traveling along an expressway and a general road. As illustrated in FIG. 19, for example, the display content (a color of the linear arrow 210 in this example) may be changed (replaced) in synchronization with a rapid change in brightness of surrounding light or lighting of a small light in a tunnel. Alternatively, a color in which the mark (arrow 210) is difficult to see can be also thought to be consciously heavily irradiated by in-tunnel illumination in a tunnel.

Note that, in this case, the color of the linear arrow 210 serving as the display content may be appropriately set by the aforementioned light distribution control ECU 40 using respective signals from the aforementioned illuminance sensor 57 and chromaticity sensor 58. If the driver does not turn on the light in the traveling in the tunnel, mode switching (specifically, switching on the light) can also be performed by detecting a natural-light change or illumination light in the tunnel. Further, if a signal from the vehicle speed sensor 54 is also used in traveling in a tunnel on an expressway, an average traveling speed in a predetermined time period is detected, and an optimum display content can also be projected for driving information about the vehicle while also considering the average traveling speed. More specifically, it is recognized from the average traveling speed in the predetermined time period that the vehicle is traveling along the expressway. A display method at the time of traveling in the tunnel may be similar to a display state in the evening/at night, for example. Even in traveling along the expressway, its mode returns to a general road mode at a time of a traffic jam. Therefore, it is conceivable to be interlocked with the navigation device or provided with a step of confirming whether the vehicle has left the expressway.

Note that various examples of the present invention have been described above, but the present invention is not limited to the embodiments described above and includes various modification examples. For examples, the embodiments above have been described in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

Some or all of the aforementioned respective components, functions, processing units, processing means, and the like may be realized through hardware by a design using an integrated circuit, for example. The aforementioned respective components, functions, and the like may be implemented by software by processors interpreting and executing programs for implementing their respective functions. Information such as programs, tables, and files, etc. for implementing the respective functions can be placed on a recording device such as a memory, a hard disk, and an SSD (Solid State Drive) and a recording medium such as an IC card, an SD card, and a DVD.

In addition, contents of the present invention including the various examples described above will be summarized below.

(1) If the blinker is lighted/flashed in a right turn/left turn, a flashing period is made variable depending on a speed/steering angle.

(2) If the steering wheel is operated in a right turn/left turn, a display content/display position is made variable depending on the steering angle (e.g., is an oblique mark when the blinker is started and is changed to an L-shaped mark when the steering angle becomes large).

(3) If the steering wheel is operated when the vehicle is put into a garage or is parked, a display/arrow of a traveling range is changed depending on a steering angle/gear.

(4) If the blinker is lighted/flashed in a right turn/left turn, a projected image is interlocked (synchronized or alternated) with lighting/flashing of the turn signal.

(5) If the blinker is lighted/flashed in a right turn/left turn, the lighting/flashing of the blinker is made the same in color as the lighting/flashing of the turn signal.

(6) If the blinker is lighted/flashed in a right turn/left turn, a display position of a mark is changed at a right turn/left turn.

(7) If the steering wheel is operated in a right turn/left turn, the presence or absence of lighting/flashing the blinker is detected, and a display representing a right turn/left turn is performed when the blinker is lighted/flashed (e.g., interlocking with the blinker and/or the steering wheel).

(8) If the blinker is lighted/flashed in a right turn/left turn, a display distance of a mark is interlocked with a GPS or a navigation system and changed depending on a distance therefrom to an intersection (e.g., the mark is displayed far from the own vehicle when the distance therefrom to the intersection is long, and the display is brought close to the own vehicle as it approaches to the intersection).

(9) If the blinker is lighted/flashed in a right turn/left turn, a color and a shape of a mark are changed depending on a distance therefrom to the intersection (e.g., the color is changed to blue yellow red, or its size is gradually increased).

(10) If the blinker is lighted/flashed in a right turn/left turn, a right-turn/left-turn arrow (e.g., the letter L) is large-displayed/flashed.

(11) If the blinker is lighted/flashed in a lane change, an arrow is not the letter L which brings an image of a right turn/left turn, and a linear arrow is obliquely displayed.

(12) If the blinker is lighted/flashed in a lane change, marks are displayed on diagonally right and left front sides to be seen by a following vehicle(s).

(13) If the blinker is lighted/flashed in a lane change, not an arrow but a track of a vehicle is displayed to clarify a place which the own vehicle enters.

(14) If the blinker is lighted/flashed in a lane change, a camera image of a lane to be changed is projected (e.g., an image etc. of a side surface serving as a driver's blind spot).

(15) If the blinker is lighted/flashed in a lane change, a time period of lighting/flashing the blinker is shorter than that at the time of a right turn/left turn. Therefore, since projection display is not performed in time, or a projection time period may be too short, there is a need to simplify a processing method until the projection display and to reduce a time difference, or to continue the projection display in a predetermined time period or more.

(16) Projection display is performed only when the blinker is lighted/flashed after a predetermined time period, for example, if it is assumed that an operation for indicating the blinker has been erroneously performed.

(17) If the steering wheel is operated in garaging or parking the vehicle, an average traveling speed in any time period is detected, and L-shaped expression of a right turn/left turn is not displayed in response to a detection result (i.e., separation from a case where the vehicle decelerates in a right turn/left turn).

(18) If the steering wheel is operated in garaging or parking the vehicle, an alert is displayed (e.g., on any one or all of the front, rear, right, and left sides of the vehicle).

(19) If the steering wheel is operated in garaging or parking the vehicle, attention attraction is interlocked with a hazard and displayed.

(20) If the steering wheel is operation in garaging or parking the vehicle, attention attraction is displayed to a surrounding pedestrian or the like (mainly in backing etc.).

(21) If the steering wheel is operated in garaging or parking the vehicle, a parking area is lighted/flashed by red or the like (a parking mode).

(22) A display content is changed at each time of traveling in a tunnel, along an expressway, and along a general road. A projection distance of a mark is changed depending on the respective speeds.

(23) A display content is changed at each time of traveling in a tunnel, along an expressway, and along a general road. A driver's view angle changes depending on a traveling speed. Therefore, the display content is displayed at a wide angle in a low speed, and is displayed at a narrow angle in a high speed.

(24) A display content is changed at each time of traveling in a tunnel, along an expressway, and along a general road. The display content is changed in synchronization with lighting of a small light in the tunnel (color replacement). If a driver does not turn on the light, the driver recognizes that the vehicle is traveling in the tunnel by detecting a natural-light change or in-tunnel illumination. The driver recognizes that the vehicle is traveling along the expressway from an average traveling speed during a predetermined time period. A display method at the time of traveling in the tunnel may be similar to that in a display state in the evening/at night, for example. Its mode returns to a general road mode at the time of a traffic jam even in traveling along the expressway. Therefore, the vehicle is interlocked with a navigation device or provided with a step of confirming whether the vehicle has left the expressway.

(25) In traveling in a tunnel, a color, which is difficult to see by in-tunnel illumination, is consciously heavily irradiated. Alternatively, a color, which is easy to see, is irradiated.

In association with the foregoing item (5):

(26) OFF timing of a light source is changed between a display mode from an image source input and a display mode at a traveling time or the like (e.g., ON/OFF of the image projection apparatus is (are) changed depending on a driving situation in the display mode at the traveling time or the like, and the image projection apparatus is always turned ON in the display mode from the image source input). In the display mode from the image source input, a headlight is turned OFF, and the image projection apparatus is turned ON. In the display mode at the traveling time or the like, both of the headlight and the image projection apparatus are also turned ON.

(27) A light source in the image projection apparatus is turned ON when needed, and is turned OFF otherwise.

(28) Even at a time of engine OFF, the light source can be turned ON. Alternatively, at the time of engine OFF, the image projection apparatus is not started.

(29) At the time of the engine OFF, functions are restricted (e.g., security and a warning are turned ON, and others (e.g., display from the image source input) are not so).

(30) At the time of the engine OFF, power from the light source is brought into an energy saving mode.

<Projected Image and Behavior of Vehicle>

Furthermore, when a vehicle and a projected image have independently moved, an attention of a person who is seeing the projected image (other person such a pedestrian and a driver of the other party) is distracted. Thus, the projected image becomes difficult to visually recognize.

More specifically, for example, when the own vehicle has once stopped for a red traffic signal in an attempt to turn right or turn left at an intersection, an image including, for example, an arrow etc. and representing a direction in which the own vehicle travels is projected onto a road surface ahead of the own vehicle (at the intersection). At this time, an arrow or the like serving as an image representing a direction in which the own vehicle travels is effectively displayed for the purpose of attracting attention of another person who is seeing the projected image (other person such as a pedestrian and a driver of the other party).

However, in this case, the projected image also simultaneously moves as the vehicle starts moving. That is, when both of the vehicle and the projected image have moved, the other person who is seeing the projected image is rather confused so that an intended purpose may be unable to be achieved. Therefore, in the other example, stillness movement of a projection position onto the road surface of the projected image are appropriately switched to match a behavior or the own vehicle.

A more specific example is illustrated in FIGS. 20 and 21. First, FIG. 20 illustrates a state where an own vehicle 10 has stopped at an intersection. In this case, an image representing a direction in which the own vehicle travels is projected onto a road surface ahead of the own vehicle. Note that, in this example, as is apparent from FIGS. 20(A) to 20(C), an arrow 200 (right-turn in this example) representing a direction in which an own vehicle travels is displayed for the purpose of more urging a pedestrian and a driver of an oncoming vehicle to pay attention to a traveling direction of the own vehicle, and the arrow 200 is displayed as a moving image (e.g., the arrow 200 is flashed) for the purpose of also enhancing visibility from a long distance or a blind spot. Note that the own vehicle stops just before the intersection at this time, and so a projection position of the image onto the road surface remains still. The arrow 200 represented by this moving image is preferably drawn in color (e.g., red) easily identified even on the road surface.

FIG. 21 illustrates states where the own vehicle 10 starts moving at an intersection to enter the intersection and drives through the intersection. In this case, a position of an arrow 200 projected onto a road surface ahead of the own vehicle remains still at an initial display position. That is, in this case, as is apparent from FIGS. 20(A) to 20(C), the own vehicle 10 moves along the arrow 200 projected onto the road surface, and the arrow 200 is displayed as if the own vehicle 10 has stepped on the arrow 200 and traveled. Note that a pedestrian and an oncoming vehicle, further a crosswalk, and the like are omitted to simplify illustration in FIGS. 20 and 21.

In this example, in details of the light distribution control ECU 40 and the peripheral elements illustrated in FIGS. 3 and 4 described above, the light distribution control ECU 40 accepts respective signals from the steering-wheel steering angle sensor 52, the vehicle speed sensor 54, the accelerator operation sensor 55, and the like, and grasps the behavior of the own vehicle 10 while calculating the current position of the own vehicle 10 based on these signals, for example. On the other hand, for the arrow 200 projected onto the road surface ahead of the own vehicle, calculation for correcting the arrow 200 can be made so that the arrow 200 is displayed with its position remaining still. When an image generated on the display element 502 illustrated in FIG. 5 is changed and projected via the display element driving unit 503, display can be realized as if the arrow 200 has remained still and the own vehicle 10 has moved along this arrow 200.

That is, particularly after the own vehicle 10 stops at the intersection or the like and its traveling direction is displayed by the arrow 200 or the like, a display position of the arrow 200 is not interlocked with movement of the vehicle 10, a position of the own vehicle 10 is grasped by a vehicle speed pulse, a steering angle of a steering wheel, and the like so that the display position does not vary as much as possible, and a display position of an image cannot be interlocked with the movement of the own vehicle but fixed by correction required for remaining at an initial display position (that is, the display position of the image onto a road can be fixed/moved). Note that examples of a trigger for the fixing include a case where the own vehicle 10 is changed from a stopping state to a traveling state, a case where the steering wheel starts to be turned (a predetermined steering angle is detected), or their combination. If correction required for the image generated on the display element 502 is not made, the display position of the image is interlocked with the movement of the vehicle. Thus, the light distribution control ECU 40 grasps the behavior of the own vehicle 10 in response to the respective signals from various types of sensors, and simultaneously determines fixing/movement of the display position of the image onto the road.

As described above, stillness/movement of the image projected onto the road surface are changed to match the behavior of the own vehicle. More specifically, attention of another person (a pedestrian, or a driver of the other party, etc.) is attracted by moving a projected image (a moving image representing the arrow 200) at an own-vehicle stopping time. On the other hand, if the own vehicle is moving (traveling), distraction of the attention is avoided by making the projected image stand still (making also the projection position onto the road surface fixed) and by shifting the attention to the own vehicle, and so safety can be improved.

In the examples described in detail above, the display of a moving direction of the own vehicle particularly in attempting to turn right or turn left the own vehicle at the intersection has been described in detail, but the display can also be similarly implemented even in other cases. As its example, the present invention is also similarly applied to the display performed even when the steering wheel is operated in garaging the vehicle as illustrated in FIG. 9, for example. Note that, in this case, the arrow 200 representing the traveling direction is displayed behind the own vehicle 10, and simultaneously the rectangular frame 220 for displaying a traveling range of the own vehicle 10 is displayed. However, when the arrow 200 is displayed using a moving image similarly to the aforementioned examples, and thereby a presentation (warning) is made more surely to the surrounding driver or pedestrian so that higher safety can be ensured. Incidentally, at that time, even if the own vehicle moves backward, a position of the display including the arrow 200 projected onto the road surface behind the own vehicle is made to remain still (fixed) at an initial position.

Thus, similarly to the aforementioned examples, when the arrow 200 is displayed as a moving image, the attention can be attracted more surely to the surrounding driver or pedestrian, and higher safety can be ensured by avoiding confusion between the own vehicle and the image displayed when the vehicle has actually moved back.

Furthermore, as also illustrated in FIG. 15 described above, for example, if the own vehicle 10 is backed up and if the attention is interlocked with a hazard and attracted, the mark 230 (FIG. 15(A)) for announcing a danger projected onto the road surface or the like behind the vehicle, the characters "being backed up" 240 (FIG. 15(B)) projected onto the road surfaces or the like ahead of and behind the vehicle, or the like are also respectively displayed as a moving image, so that the attention can be attracted more surely to the surrounding driver or pedestrian. However, in these cases, particularly in FIG. 15(A), when the vehicle starts moving, the mark 230 for announcing a danger already need not be displayed, and is not displayed. When the characters "being backed up" 240 illustrated in FIG. 15(B) are displayed, the display of the characters 240, together with the vehicle which is being backed up may be moved. Instead of this, the display position may be fixed similarly to the aforementioned examples. According to such display of the image, a presentation (warning) is made more surely to the surrounding driver or pedestrian particularly at the time of parking, so that high stability can be ensured. That is, the description has been made mainly using the arrow as display representing the traveling direction of the vehicle in the aforementioned examples, but the present invention is not limited to this. Shapes and character information, etc. representing other directions may be used.

REFERENCE SIGNS LIST

10 . . . own vehicle (passenger vehicle); 10' . . . another vehicle; 11 . . . headlight; 12 . . . window; 13, 13' . . . tail lamp; 40 . . . light distribution control ECU; 51 . . . direction indicator sensor; 52 . . . steering-wheel steering angle sensor; 53 . . . shift position sensor; 54 . . . vehicle speed sensor; 55 . . . accelerator operation sensor; 56 . . . brake operation sensor; 57 . . . illuminance sensor; 58 . . . chromaticity sensor; 59 . . . engine start sensor; 60 . . . hazard lamp sensor; 61 . . . camera; 62 . . . image processing unit; 63 . . . GPS receiving unit; 64 . . . map information output unit; 66 . . . headlight sensor; 67 . . . high/low sensor; 100 . . . projector; 110 . . . projection signal output unit; 120 . . . control unit; 500 . . . image projection apparatus; 501 . . . projection optical system; 502 . . . display element; 503 . . . display element driving unit; 504 . . . illumination optical system; 505 . . . light source; 531 . . . image signal input unit; 533 . . . voice signal input unit; and 532 . . . communication unit.

The invention claimed is:

1. A vehicle having an image projector for projecting an image on a road surface, the vehicle comprising:
a body,
a receiver that receives, as information about a vehicle, information about a direction indicator, information about a traveling speed of the vehicle, and information about a change in a steering-wheel steering angle of a steering wheel, the receiver is mounted on the vehicle; and
the image projector that projects the image onto a road surface around the vehicle based on the information from the receiver, wherein the image projector has functions of displaying the projected image as a moving image and fixing or moving a display position of the moving image as the image onto the road surface depending on a behavior of the vehicle, wherein when the vehicle is changed to a traveling state from a stopping state at an intersection and a predetermined steering angle is detected, the image projector is configured to:

project a traveling path image to a fixed position on a road surface in the intersection, the traveling path image indicating a traveling path on which the vehicle travels in the intersection, and even when the vehicle is traveling on a first part of the fixed position where the traveling path image is projected, continue to project a part of the traveling path image to a second part of the fixed position where the vehicle has not reached, and wherein a leading end of the second part remains at a leading end of the fixed position on the road surface until the vehicle passes over the leading end of the fixed position of the road.

2. The vehicle according to claim 1,
wherein the image projector displays, as the moving image, the image representing a traveling direction of the vehicle.

3. The vehicle according to claim 1,
wherein the image projector obtains the behavior of the vehicle from information about a vehicle speed and/or a traveling direction obtained by the receiver in order to determine whether to fix or move a display position of the image displayed as the moving image.

4. The vehicle according to claim 1,
wherein, after the vehicle has once stopped, the image projector displays the image as the moving image and determines whether to fix or move a display position of the image depending on the behavior of the vehicle.

5. The vehicle according to claim 1,
wherein the image displayed as the moving image by the image projector is an arrow moving image indicating the traveling direction of the vehicle.

6. The vehicle according to claim 1,
wherein the image projector projects a mark representing a traveling direction of the vehicle and/or an entrance track of the vehicle onto a roadway adjacent to a roadway on which the vehicle travels.

7. The vehicle according to claim 1,
wherein the receiver receives information about a direction indicator signal, and wherein the image projector projects a mark representing a traveling direction of the vehicle and/or an entrance track of the vehicle onto a roadway adjacent to a roadway on which the vehicle travels, after a predetermined time period or more passes.

8. The vehicle according to claim 1,
The image projector flashes a mark representing the traveling direction of the vehicle, the mark being acquired by the receiver, and
the image projector sets a period of the flashing of the mark in accordance with a traveling speed and a steering-wheel steering angle of the vehicle.

* * * * *